(12) United States Patent
Tateishi et al.

(10) Patent No.: US 12,330,218 B2
(45) Date of Patent: Jun. 17, 2025

(54) METHOD FOR MANUFACTURING SINTERED PRODUCT FROM THREE-DIMENSIONAL OBJECT, AND 3D SHAPING INKJET INK

(71) Applicants: Gifu Prefecture, Gifu (JP); MIMAKI ENGINEERING CO., LTD., Nagano (JP)

(72) Inventors: Kenji Tateishi, Gifu (JP); Seizo Obata, Gifu (JP); Yukiko Kobayashi, Nagano (JP); Kazuki Ohara, Nagano (JP)

(73) Assignees: Gifu Prefecture, Gifu (JP); MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 17/917,245

(22) PCT Filed: Apr. 2, 2021

(86) PCT No.: PCT/JP2021/014398
§ 371 (c)(1),
(2) Date: Oct. 6, 2022

(87) PCT Pub. No.: WO2021/206029
PCT Pub. Date: Oct. 14, 2021

(65) Prior Publication Data
US 2023/0150020 A1 May 18, 2023

(30) Foreign Application Priority Data

Apr. 8, 2020 (JP) .................................. 2020-069640
Apr. 8, 2020 (JP) .................................. 2020-069641

(51) Int. Cl.
*B22F 3/16* (2006.01)
*B22F 3/10* (2006.01)
(Continued)

(52) U.S. Cl.
CPC .................. *B22F 3/10* (2013.01); *B22F 3/16* (2013.01); *B29C 64/165* (2017.08);
(Continued)

(58) Field of Classification Search
None
See application file for complete search history.

(56) References Cited

U.S. PATENT DOCUMENTS 5,486,331 A * 1/1996 Adachi ................. C04B 35/638
264/645
5,738,817 A 4/1998 Danforth et al.
(Continued)

FOREIGN PATENT DOCUMENTS

CN  106810215   6/2017
CN  107915485   4/2018
(Continued)

OTHER PUBLICATIONS

English translation of CN108249930A (Year: 2018).*
(Continued)

*Primary Examiner* — Jacob J Cigna
(74) *Attorney, Agent, or Firm* — JCIPRNET

(57) ABSTRACT

A method for manufacturing a sintered product from a three-dimensional object includes: A preparation step S11, a multilayer made of an ink containing inorganic particles and an organic material is formed to prepare a three-dimensional object. A degreasing step S12 includes: a first degreasing step of heating the three-dimensional object under an inert gas atmosphere at a first average degreasing temperature (T1) for a first heating time to degrease the organic material; and a second degreasing step of heating the three-dimensional object degreased in the first degreasing step, under an inert gas atmosphere at a second average degreasing temperature (T2) higher than T1 for a second heating time to
(Continued)

degrease the organic material. A sintering step S13, the three-dimensional object degreased in the second degreasing step is sintered at an average sintering temperature higher than T2 to obtain a sintered product.

7 Claims, 6 Drawing Sheets

(51) Int. Cl.
    | | |
    |---|---|
    | *B29C 64/165* | (2017.01) |
    | *B29C 64/209* | (2017.01) |
    | *B33Y 10/00* | (2015.01) |
    | *B33Y 70/10* | (2020.01) |
    | *B33Y 80/00* | (2015.01) |
    | *C09D 11/101* | (2014.01) |
    | *C09D 11/38* | (2014.01) |

(52) U.S. Cl.
    CPC .......... *B29C 64/209* (2017.08); *C09D 11/101* (2013.01); *C09D 11/38* (2013.01); *B33Y 10/00* (2014.12); *B33Y 70/10* (2020.01); *B33Y 80/00* (2014.12)

(56) References Cited

U.S. PATENT DOCUMENTS

| | | | | |
|---|---|---|---|---|
| 2007/0054229 | A1* | 3/2007 | Hanzawa | ................ C04B 38/06 |
| | | | | 432/266 |
| 2018/0298215 | A1* | 10/2018 | Andersen | .............. C04B 35/447 |

FOREIGN PATENT DOCUMENTS

| | | | | |
|---|---|---|---|---|
| CN | 108249930 | | 7/2018 | |
| CN | 108249930 A | * | 7/2018 | ............. B33Y 70/00 |
| CN | 109180152 | | 1/2019 | |
| JP | 2001049307 | | 2/2001 | |
| JP | 2006282978 | | 10/2006 | |
| JP | 2007123261 | | 5/2007 | |
| JP | 2018536556 | | 12/2018 | |

OTHER PUBLICATIONS

"Office Action of China Counterpart Application", issued on Mar. 10, 2023, with English translation thereof, p. 1-p. 19.
"Office Action of Japan Counterpart Application", issued on Apr. 30, 2024, with English translation thereof, pp. 1-6.
"Partial Supplementary Search Report of Europe Counterpart Application", issued on Sep. 7, 2023, p. 1-p. 14.
Wada Tomohiro et al., "Development of Atmospheric Gas Technology for Dewax and Sintering in Fine Ceramics Products" Submit with English translation thereof, Technical report of Taiyo Nippon Sanso Corporation, 2010, pp. 1-6.
Kozo Osakada, "Present State of Net Shape Forming" Submit with English translation thereof, Journal of the Japan Society for Precision Engineering, vol. 80, 2014, pp. 1-6.
"International Search Report (Form PCT/ISA/210) of PCT/JP2021/014398," mailed on Jun. 1, 2021, with English translation thereof, pp. 1-5.

* cited by examiner

METHOD FOR MANUFACTURING SINTERED PRODUCT FROM THREE-DIMENSIONAL OBJECT, AND 3D SHAPING INKJET INK

CROSS-REFERENCE TO RELATED APPLICATION

This application is a 371 application of the International PCT application serial no. PCT/JP2021/014398, filed on Apr. 2, 2021, which claims the priority benefits of Japan Patent Application No. 2020-069640, filed on Apr. 8, 2020 and Japan Patent Application No. 2020-069641, filed on Apr. 8, 2020. The entirety of each of the above-mentioned patent applications is hereby incorporated by reference herein and made a part of this specification.

TECHNICAL FIELD

The present invention relates to a method for manufacturing a sintered product from a three-dimensional object, and a 3D shaping inkjet ink.

BACKGROUND ART

Ceramic products are manufactured by molding a mixture of a ceramic raw material powder and an organic binder by injection molding, extrusion molding, casting molding, or the like, and then performing a degreasing step and a sintering step (Non Patent Literature 1).

As the organic binder, for example, Patent Literature 1 discloses a copolymer having a segment derived from a (meth)acrylic acid alkyl ester monomer and a specific polyalkylene oxide segment.

As a mixture, for example, Patent Literature 1 discloses a ceramic paste containing a binder resin composition and a ceramic powder. The binder resin composition is a binder resin composition in which a copolymer having a segment derived from a (meth)acrylic acid alkyl ester monomer and a polyalkylene oxide segment is used as a matrix resin. Patent Literature 1 states that this ceramic paste is screen-printed and fired to obtain a layered ceramic sintered body.

As a method for forming a three-dimensional shape, in addition to repeating such screen printing, a 3D printing shaping method of repeating ejecting a liquid curable ink to form an ink layer and curing the ink layer to form a cured layer, thereby forming a three-dimensional shape is known as a 3D (three-dimensional) shaping method.

Also in the manufacturing of ceramic products, attempts have been made with a manufacturing method for ceramic products by using a 3D printing shaping method for molding (Non Patent Literature 2).

For example, Patent Literature 2 discloses a method including a step of 3D printing a desired 3-dimensional object by using, as a feedstock, a suspension containing a ceramic material, a polymer material, and the like at 50 to 95 wt % (w/w) of the total weight, a step of performing sintering, and the like.

CITATION LIST

Non Patent Literature

Non Patent Literature 1: Technical report of Taiyo Nippon Sanso Corporation, No. 29, page 27, 2010

Non Patent Literature 2: Journal of the Japan Society for Precision Engineering, Vol. 80, No. 12, page 1,066, 2014

PATENT LITERATURE

Patent Literature 1: Japanese Unexamined Patent Publication No. 2006-282978

Patent Literature 2: Japanese Translation of PCT International Application Publication No. 2018-536556

SUMMARY OF INVENTION

Technical Problems

Conventionally, when a sintered product is manufactured by degreasing and sintering a three-dimensional object, in a degreasing step, heating is performed rapidly (for example, at a temperature rising rate of 10° C./min) to a desired degreasing temperature, and then heating is performed at a constant degreasing temperature until most of the organic substance in the three-dimensional object is removed.

However, when a three-dimensional object having a large resin content is degreased in a conventional degreasing step, there has been a problem that defects such as cracking and distortion are likely to occur.

Furthermore, among inks used for 3D printing, ink ejected by an inkjet method needs to have a low volume ratio of the ceramic material because the ink is ejected from the inkjet nozzle.

However, when the volume ratio of the ceramic material is reduced, the storability of the ink may be insufficient, and when a shaped object formed from the ink is degreased, shrinkage of the formed object may be significantly uneven and cracking may occur, and a ceramic product may not be obtained due to generation of cracks at the time of subsequent sintering.

In view of the above, the present invention is required to appropriately manufacture a sintered product from a three-dimensional object.

Solutions to Problems

A method for manufacturing a sintered product from a three-dimensional object according to the present invention includes:
a step of forming a multilayer made of an ink containing inorganic particles and an organic material to prepare a three-dimensional object;
a first degreasing step of heating the three-dimensional object at a first average degreasing temperature for a first heating time under an inert gas atmosphere to degrease the organic material;
a second degreasing step of heating the three-dimensional object degreased in the first degreasing step, under an inert gas atmosphere at a second average degreasing temperature higher than the first average degreasing temperature for a second heating time to degrease the organic material; and
a sintering step of sintering the three-dimensional object degreased in the second degreasing step, at an average sintering temperature higher than the second average degreasing temperature to obtain a sintered product.

According to the above configuration, degreasing is performed stepwise, and thus occurrence of defects such as cracking and distortion can be suppressed. As a result, the sintered product can be appropriately manufactured from the three-dimensional object.

In the first degreasing step and the second degreasing step, a temperature rising rate at the time of heating to the first average degreasing temperature and the second average degreasing temperature is desirably less than 10° C./min.

According to the above configuration, the temperature rising rate is low, and thus the possibility of occurrence of defects is further reduced.

The second average degreasing temperature is desirably a temperature at which when an object containing the organic material is heated at the temperature under an inert gas atmosphere for 30 minutes, 80 mass % or more of the organic material in the object before heating is degreased.

According to the above configuration, most of the organic material is degreased from the three-dimensional object before firing, and thus the total amount itself of the organic material released from the three-dimensional object at the time of sintering is reduced. As a result, the possibility of occurrence of defects in the sintering step is further reduced.

The method for manufacturing a sintered product from a three-dimensional object desirably further includes, between the first degreasing step and the second degreasing step, one or more additional degreasing steps of heating and degreasing the three-dimensional object under an inert atmosphere at an average degreasing temperature higher than the first average degreasing temperature and lower than the second average degreasing temperature, in which when the method includes two or more of the additional degreasing steps, the average degreasing temperature of each of the additional degreasing steps is increased stepwise.

According to the above configuration, degreasing is performed in a further stepwise manner, and thus the possibility of occurrence of defects is further reduced.

The present inventors have studied the composition of the ink and degreasing. The present inventors have found that when a 3D object obtained by ejecting and curing ink is degreased to a specific degreasing percentage under a nitrogen atmosphere, the shape of the degreased body is temporarily retained, and a ceramic product is obtained without cracking at the time of firing. In addition, the present inventors have found that use of a plurality of types of polymerizable compounds as a curable binder component facilitates degreasing to a specific degreasing percentage.

In other words, the 3D shaping inkjet ink according to the present invention is a 3D shaping inkjet ink containing: a ceramic component; and a curable binder component, in which the curable binder component is a component that can be degreased at a degreasing percentage at which when a degreased body is obtained by degreasing a 3D object formed by curing the 3D shaping inkjet ink, a shape of the degreased body is maintained, and the curable binder component contains a plurality of types of polymerizable compounds.

According to the above configuration, a ceramic product can be easily obtained without cracking when a 3D object formed by inkjet printing is fired. As a result, the sintered product can be appropriately manufactured from the three-dimensional object.

The content of the ceramic component in the 3D shaping inkjet ink is preferably 10 vol % or more and 50 vol % or less.

According to the above configuration, the ink ejectability is excellent.

The plurality of types of polymerizable compounds are preferably components with which the 3D object shrinks without cracking when the 3D object is degreased.

According to the above configuration, cracking hardly occurs even when the obtained degreased body is sintered, and a ceramic product is easily obtained.

The plurality of types of polymerizable compounds preferably have a degreasing percentage of 80 wt % or more and 90 wt % or less when the degreasing temperature is 320° C. or higher and 350° C. or lower.

According to the above configuration, when the 3D object is fired, the change in shape of the sintered body is small, and cracking hardly occurs.

The plurality of types of polymerizable compounds preferably include a monomer and an oligomer.

According to the above configuration, the change in shape between the 3D object and the sintered body thereof is smaller.

The plurality of types of polymerizable compounds preferably include a monofunctional polymerizable compound and a polyfunctional polymerizable compound.

According to the above configuration, the change in shape between the 3D object and the sintered body thereof is smaller.

The plurality of types of polymerizable compounds preferably include: at least one monofunctional monomer selected from the group consisting of benzyl acrylate, phenoxyethyl acrylate, and 2-(2-ethoxyethoxy)ethyl acrylate; and a polyfunctional urethane acrylate-based oligomer.

According to the above configuration, the change in shape between the 3D object and the sintered body thereof is smaller.

Effect of the Invention

According to the present invention, a sintered product can be appropriately manufactured from a three-dimensional object.

DESCRIPTION OF EMBODIMENTS (Manufacturing Method for Sintered Product)

A manufacturing method for a sintered product according to an embodiment of the present invention will be described.

Figure 1:
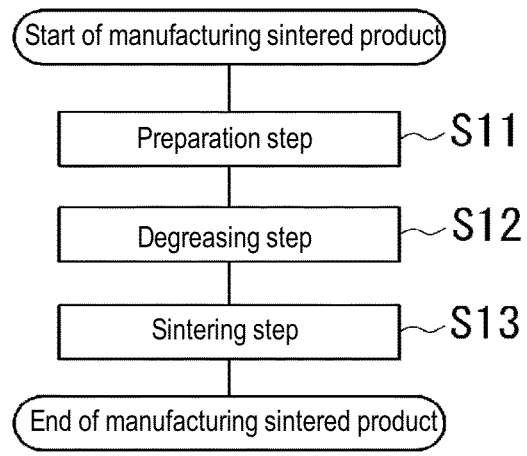
FIG. 1 is a flowchart of a manufacturing method for a sintered product according to an embodiment of the present invention.

In the manufacturing method, as shown in FIG. 1, a three-dimensional object is prepared (step S11), the three-dimensional object is degreased in at least two stages at different temperatures (step S12), and finally the three-dimensional object after degreasing is sintered to obtain a sintered product (step S13).

(Step S11)

In step S11, a three-dimensional object is prepared.

The three-dimensional object is formed of a mixture of shaping inorganic particles and a shaping organic material. The state of each of the shaping inorganic particles and the shaping organic material is desirably a solid, but may be another state, for example, a gel.

The ratio of the shaping inorganic particles to the shaping organic material in the three-dimensional object may be 0.5 to 2.0, 0.5 to 1.5, or particularly 0.5 to 1.0 as a value obtained by dividing the mass of the shaping inorganic particles by the mass of the shaping organic material.

(Shaping Inorganic Particles)

The shaping inorganic particles are arbitrary as long as they are inorganic particles that are integrated with each other after sintering in step S13 described later and constitute a sintered product.

The particle size of the shaping inorganic particles is arbitrary as long as the sintered product can be formed after sintering in step S13.

Examples of the component of the shaping inorganic particles include a ceramic material, a metal material, a carbon material, or a mixture thereof. Each particle of the shaping inorganic particles may be composed of a single material or may be composed of a mixture of a plurality of materials. The shaping inorganic particles may be composed of a mixture of particles made of a plurality of different materials.

The ceramic material is an inorganic nonmetallic material made of a compound containing a metal element and a nonmetallic element. Examples of the ceramic material include TCP (tricalcium phosphate), MCP (monocalcium phosphate), DCP (dicalcium phosphate), tetracalcium phosphate, hydroxyapatite, α-TCP, β-TCP, titanium oxide (titania), aluminum oxide (alumina), zirconium oxide (zirconia), yttrium oxide (yttria), yttria stabilized zirconia, indium oxide, indium tin oxide, boron nitride, silicon carbide, boron carbide, tungsten carbide, beryllium oxide, zeolite, cerium oxide (ceria), tungsten disilicide, sodium silicide, platinum silicide, zirconium nitride, tungsten nitride, vanadium nitride, tantalum nitride, niobium nitride, silicon boride, clay, earth, soil, cement, Portland cement, silica, barium titanate, lead zirconate titanium, zinc oxide, potassium niobate, lithium niobate, sodium tungstate, glass, geopolymer, sodium chloride, sodium nitrate, potassium nitrate, potassium chloride, magnesium chloride, calcium chloride, calcium nitrate, magnesium nitrate, strontium oxide, strontium phosphate, calcium sulfate, barium sulfate, calcium carbonate, sodium carbonate, sodium fluoride and mixtures thereof.

Examples of the metal material include copper, zinc, aluminum, iron, silver, gold, palladium, platinum, tin, antimony, bismuth, lead, nickel, cobalt, vanadium, manganese, chromium, titanium, tantalum, tungsten, neodymium, lithium, sodium, osmium, iridium, uranium, thorium, plutonium, yttrium, zirconium, niobium, molybdenum, rhodium, cadmium, hafnium, rhenium, mercury, gallium, indium, thallium, lanthanum, cerium, praseodymium, promethium, samarium, europium, gadolinium, terbium, dysprosium, holmium, erbium, thulium, ytterbium, lutetium, potassium, calcium, magnesium, strontium, barium, germanium, arsenic, and astatine; and alloys and hydrides thereof.

Examples of the carbon material include carbon allotropes such as graphite, graphene, and carbon nanotube.

(Shaping Organic Material)

The shaping organic material is any organic material that is mixed with the shaping inorganic particles in the three-dimensional object and provides strength enough to maintain the three-dimensional shape of the three-dimensional object at the stage of degreasing and sintering.

Most of the shaping organic material is degreased in step S12 described later, but the remaining shaping organic material can help maintain the three-dimensional shape of the three-dimensional object through steps S12 and S13.

Examples of the shaping organic material include polymer materials.

Examples of the polymer material include polylactic acid (PLA), polycaprolactone (PCL), polyglycolic acid (PGA), polystyrene (PS), polyethylene (PE), polypropylene (PP), polycarbonate (PC), poly(methyl methacrylate) (PMMA), poly(1,4-phenylene sulfide) (PPS), poly(2,6-dimethyl-1,4-phenylene oxide) (PPO), polyimide (PA), polybutylene terephthalate (PBT), polyetheretherketone (PEEK), polyetherketone (PEK), polyethylene terephthalate (PET), polyimide (PI), polyoxymethylene (POM), polysulfone (PSU), polyurethane (PU), polybutadiene (PB), polytetrafluoroethylene (PTFE), polyvinyl fluoride (PVF), polyvinylidene fluoride (PVDF), polychlorotrifluoroethylene (PCTFE), perfluoroalkoxy polymer (PFA), fluorinated ethylene propylene (FEP), polyethylene tetrafluoroethylene (ETFE), polyethylene chlorotrifluoroethylene (ECTFE), polyethylene glycol (PEG), polyhydroxyalkanoic acid (PHA), polyhydroxy valeric acid (PHV), polyhydroxybutyric acid (PHB), liquid crystal polymers, polyacrylate, polyacetal, polyamideimide (PAI), polybutylene (PB), polyvinyl chloride (PVC), acrylonitrile butadiene styrene (ABS), polyphenylsulfone (PPSU), polymethylpentane (PMP), alginate, chitin, chitosan, acrylic acid, hyaluronic acid, starch, amylose, amylopectin, pectin, dextran, gum arabic, xanthan gum, pullulan, cellulose, elastin, collagen, gelatin, fibronectin, silk, polysaccharide, protein, nucleic acid, rubber, silicone, and copolymers thereof.

(Other Components)

The three-dimensional object may contain components such as a pigment, a monomer, an oligomer, a polymerization initiator, a dispersant, an antioxidant, a surfactant, and a solvent. Among these components, those satisfying the definition of the shaping inorganic particles are counted as the shaping inorganic particles, and those satisfying the definition of the shaping organic material are counted as the shaping organic material. On the other hand, among these components, those that do not satisfy the definitions of the shaping inorganic particles and the shaping organic material described above are referred to as other components.

The three-dimensional object may contain other components to such an extent as not to affect the shape of the three-dimensional object after degreasing in step S12 or sintering in step S13. The three-dimensional object may contain, for example, 33.3 to 66.7 mass %, 40 to 66.7 mass %, or 50 to 66.7 mass % of other components with respect to the mass of the three-dimensional object.

(Shaping Method for Three-Dimensional Object)

The shaping method for the three-dimensional object prepared in step S11 is not particularly limited, but an additive manufacturing method, in particular, an additive manufacturing method of a material injection method may be used. For example, a method of forming a multilayer made of a three-dimensional shaping ink by an inkjet method or a dispenser method to form a three-dimensional object may be used.

In this shaping method for a three-dimensional object, a three-dimensional object having a desired three-dimensional shape is shaped by printing and forming layers, one by one, included in a multilayer made of a three-dimensional shaping ink, and curing the layered object by an external stimulation such as radiation irradiation (for example, ultraviolet irradiation) or heating.

The three-dimensional shaping ink contains shaping inorganic particles and a fluid capable of forming the above-described polymer material, which is a shaping organic material.

The particle size of the shaping inorganic particles is arbitrary as long as it can be ejected from an inkjet nozzle or a dispenser nozzle. The particle size is, for example, 1 μm or less, preferably 500 nm or less, more preferably 400 nm or less, and still more preferably 300 nm or less. The particle size is 10 nm or more, preferably 50 nm or more, more preferably 100 nm or more, and still more preferably 200 nm or more. The particle size is particularly preferably 200 nm or more and 500 nm or less.

The fluid capable of forming the polymer material may be any fluid as long as it contains a polymerizable compound (for example, a monomer or a polymer having a lower degree of polymerization than that of the above-described polymer material) to be a raw material of the polymer material and can be ejected from an inkjet nozzle or a dispenser nozzle (for example, a liquid, a gel, or the like). Examples of the fluid include a fluid of the polymerizable compound described above, a solution in which the polymerizable compound is dissolved, a dispersion in which a fluid or solid particles of the polymerizable compound are dispersed, and gels of these solutions or dispersions.

The three-dimensional shaping ink may contain any additional components, for example, a solvent, a dispersant, a surface tension regulator, a polymerization initiator, a polymerization inhibitor, and the like according to an ink ejecting method and an ink curing method.

Furthermore, in some additive manufacturing methods (for example, the shaping method for a three-dimensional object by the inkjet method described above), the periphery of the three-dimensional object may be surrounded with a supporting composition in order to maintain the shape of the uncured three-dimensional object.

When such a supporting composition is deposited around the three-dimensional object, the supporting composition is preferably removed before moving to step S12. For example, in the case of a washable supporting composition (for example, a water-soluble supporting composition that can be washed with water), the supporting composition is washed and removed between steps S11 and S12.

When the supporting composition is naturally removed by heating in step S12 or step S13, it is not necessary to remove the supporting composition before moving to step S12. For example, when the supporting composition is the polymer material described above, most of the supporting composition is substantially removed in steps S12 and S13 together with the shaping organic material of the three-dimensional object, and it is therefore not necessary to provide an independent removing step of the supporting composition. In addition, in the case of washing and removing the supporting composition still remaining through steps S12 and S13, the amount of the supporting composition to be removed is greatly reduced, so that energy consumption is reduced.

(Step S12)

In step S12, the three-dimensional object is heated at least in two stages at different temperatures under an inert gas atmosphere such as a nitrogen atmosphere to perform degreasing.

Specifically, step S12 includes n (n is an integer of 2 or more) steps SD1 to SDn which are inert gas atmosphere degreasing steps. In each step SDk (k is 1 to n), the three-dimensional object is heated at a temperature Tk for a time Pk under the same or different inert gas atmosphere. For example, when n is 2, step SD1 is the first degreasing step and step SD2 is the second degreasing step.

The temperature T1 in step SD1 is the first average degreasing temperature during the execution of step SD1. The heating time P1 at this time is the first heating time.

The temperature T2 in step SD2 is the second average degreasing temperature during the execution of step SD2. The heating time P2 at this time is the second heating time.

(Heating Temperature)

The heating temperature Tk in each step SDk is set so as to satisfy $Tk<Tk+1$.

The heating temperature T1 in the first step SD1 may be higher than 25° C., and may be, for example, 100° C. or higher.

The heating temperature Tn in the last step SDn is desirably determined from the proportion of the organic substance to be degreased based on the relationship between the temperature and the limit degreasing percentage described below.

(Limit Degreasing Percentage)

Generally, in the case of heating an object at a certain temperature T to degrease the object, when the object is heated for a sufficiently long time, the organic substance in the object cannot be removed at R mass % or more based on the content of the organic substance in the object before degreasing. This R is referred to herein as the limit degreasing percentage at the temperature T.

The limit degreasing percentage can be determined, for example, by measuring the densities of a certain object before and after degreasing, and taking a degreasing percentage at which no substantial change in density occurs, as the limit degreasing percentage.

As the temperature increases, the limit degreasing percentage monotonically increases. Thus, the limit degreasing percentage and the temperature have a one-to-one correspondence relationship. Therefore, the heating temperature in the degreasing step can be determined from the proportion of the organic substance to be degreased in the degreasing step. It is considered that almost the same limit degreasing percentage corresponds to the same temperature even in degreasing under different inert gas atmospheres.

In step S12, when it is necessary to remove up to W mass % of the organic substance (in particular, the shaping organic material) in the three-dimensional object with respect to the initial amount but not to remove any more, the heating temperature Tn in the last step SDn is desirably set to a temperature corresponding to the limit degreasing percentage of W mass %.

The heating temperature Tn in the last step SDn may also be, for example, a temperature at which when an object containing a shaping organic material is heated at the temperature under an inert gas atmosphere for 30 minutes, 80 mass % or more of the shaping organic material in the object before heating is degreased.

When the degreasing percentage is increased, for example, when 80 mass % or more of the shaping organic material before heating is degreased, most of the organic material is degreased from the three-dimensional object before firing. As a result, the total amount itself of the organic material released from the three-dimensional object at the time of sintering is reduced. Therefore, the possibility of occurrence of defects in the sintering step is further reduced.

(Heating Time)

The heating time Pn in the last step SDn is desirably set to a length that can achieve 70%, 80%, 90%, 99%, or 100% of the limit degreasing percentage at the corresponding heating temperature Tn.

The heating time Pk in each step SDk excluding the last step SDn may be set to a length that can achieve 50%, 60%, 70%, 80%, 90%, 99%, or 100% of the limit degreasing percentage at the corresponding heating temperature Tk.

(Implementation of Steps SD1 to SDn)

Steps SD1 to SDn may be performed continuously in the same degreasing apparatus, or may be performed in different degreasing apparatuses. In any case, the three-dimensional object after degreasing may be taken out and temporarily stored in a storage place outside the degreasing apparatus at a temperature lower than that in the degreasing apparatus (for example, at 25° C.) between steps SD1 to SDn.

Furthermore, when the three-dimensional object stored outside the degreasing apparatus is subjected to step SDk, for example, when the first step SD1 is performed, or when the three-dimensional object temporarily stored outside the degreasing apparatus as described above is subjected to step SDk, the three-dimensional object may be preheated at a preheating temperature lower than the degreasing temperature of the step (additional degreasing step).

When step SDk and the next step SDk+1 are continuously performed in the same degreasing apparatus, the temperature rising rate is desirably set to such an extent that no defect of the three-dimensional object occurs, and is preferably less than 10° C./min, for example. The same applies to the temperature rising rate in the case of performing the preheating described above.

Steps SD1 to SDn can be performed by a degreasing method under any suitable inert gas atmosphere. As the degreasing apparatus, an electric furnace or the like can be used.

(Degreasing Percentage)

In step S12, most of the organic substance in the three-dimensional object is finally removed. For example, at least 70 mass %, 75 mass %, 80 mass %, 85 mass %, 90 mass %, 95 mass %, or 99 mass % of the total amount of the organic substance in the three-dimensional object prepared in step S11 may be removed through step S12. Furthermore, for example, at least 70 mass %, 75 mass %, 80 mass %, 85 mass %, 90 mass %, 95 mass %, or 99 mass % of the total amount of the shaping organic material in the three-dimensional object prepared in step S11 may be removed through step S12.

Furthermore, as described above, the shaping organic material remaining in the three-dimensional object during and/or after degreasing can help maintain the three-dimensional shape of the three-dimensional object through steps S12 and S13. Therefore, for example, at least 1 mass %, 5 mass %, 10 mass %, 15 mass %, 20 mass %, 25 mass %, or 30 mass % of the total amount of the shaping organic material in the three-dimensional object prepared in step S11 may be left in the three-dimensional object after step S12.

(Degreasing Under Oxygen Atmosphere)

Furthermore, after the degreasing under an inert gas atmosphere described above, the three-dimensional object may be optionally further heated and degreased under an oxygen atmosphere such as the atmosphere. In this case, for example, it is desirable that 80% of degreasing in the above-described degreasing percentage be achieved by degreasing under an inert gas atmosphere, and the remaining 20% be achieved by degreasing under an oxygen atmosphere. Degreasing under an oxygen atmosphere can be performed by any appropriate degreasing method.

(Step S13)

In step S13, the three-dimensional object degreased in step S12 is sintered to obtain a sintered product.

The sintering temperature is higher than the heating temperature Tn (second average degreasing temperature) in the last step SDn in step S12 described above. The sintering temperature is arbitrary as long as the shaping inorganic particles are integrated with each other after sintering to form a sintered product. For example, when the material of the shaping inorganic particles is alumina, the sintering temperature is preferably 1,500° C. to 1,700° C. The sintering temperature in the present invention is an average sintering temperature during execution of step S13.

Sintering can be performed by any suitable sintering method. As the sintering apparatus, an electric furnace or the like can be used.

(Effect of Present Manufacturing Method)

Conventionally, when a sintered product is manufactured by degreasing and sintering a three-dimensional object, in the degreasing step of the three-dimensional object, heating is performed rapidly (for example, at a temperature rising rate of 10° C./min.) to a desired degreasing temperature, and then heating is performed at a constant degreasing temperature until most of the organic substance in the three-dimensional object is removed.

However, when a three-dimensional object having a large resin content is degreased in a conventional degreasing step, there has been a problem that defects such as cracking and distortion are likely to occur.

The reason why this problem occurs is as follows. In general, a certain part may be more likely to be heated than other parts in the degreasing step because the thermal conductivity is different for each part of the three-dimensional object. Therefore, when a three-dimensional object having a large resin content is degreased in the conventional degreasing step, the degree of heating is different between adjacent parts, and thus the release rate of the degreasing component released as a gas from the adjacent parts is also different. As a result, defects such as cracking and distortion are likely to occur at the boundary between such parts.

In addition, due to an increasing demand for a three-dimensional object having high designability, it is desired to form a three-dimensional object having a complicated design by an inkjet printer, and to manufacture a fired product by degreasing and sintering. However, the three-dimensional object formed by the inkjet printer contains a large amount of resin, and further, in the three-dimensional object having a complicated design, the unevenness of heating for each site is significant. Therefore, the possibility of the occurrence of defects as described above is higher.

On the other hand, according to the present manufacturing method, degreasing is performed stepwise, and thus occurrence of defects such as cracking and distortion can be suppressed.

As a principle thereof, the following is considered. Since the total amount itself of the gas of the organic material released from the three-dimensional object at the time of degreasing on the high temperature side is reduced, even if there is variation of heating in adjacent parts in the three-dimensional object, the influence of the gas released from those parts is small, and the possibility of occurrence of defects at the boundary between those parts is low. As a result, the occurrence of defects such as cracking and distortion can be suppressed, and a sintered product can be manufactured from a three-dimensional object.

Modified Example

When the three-dimensional object contains a plurality of organic components having different degreasing temperatures, the heating temperature Tk in each step SDk may be set according to the degreasing temperature of each of the organic components. For example, when the temperatures at which the respective organic components start to be degreased (hereinafter, referred to as a degreasing start temperature) are TD1 to TDm (m is an integer of 2 or more) from the lower side, the heating temperature Tl+k in the m consecutive steps SDl+k ($1 \leq l < n$, $1 \leq k \leq m$) may be equal to TDk, approximately the same as TDk (for example, within ±10% of TDk), or in the range of TDk −20° C. to TDk −10° C.

Furthermore, step SDk using the heating temperature Tk corresponding to TD1 to TDm does not necessarily have to be continuous. For example, step SDp using the heating temperature Tp satisfying Tk≤Tp≤Tk+1 may exist between step SDk using the heating temperature Tk corresponding to TDk and step SDk+1 using the heating temperature Tk+1 corresponding to TDk+1.

Figure 2:
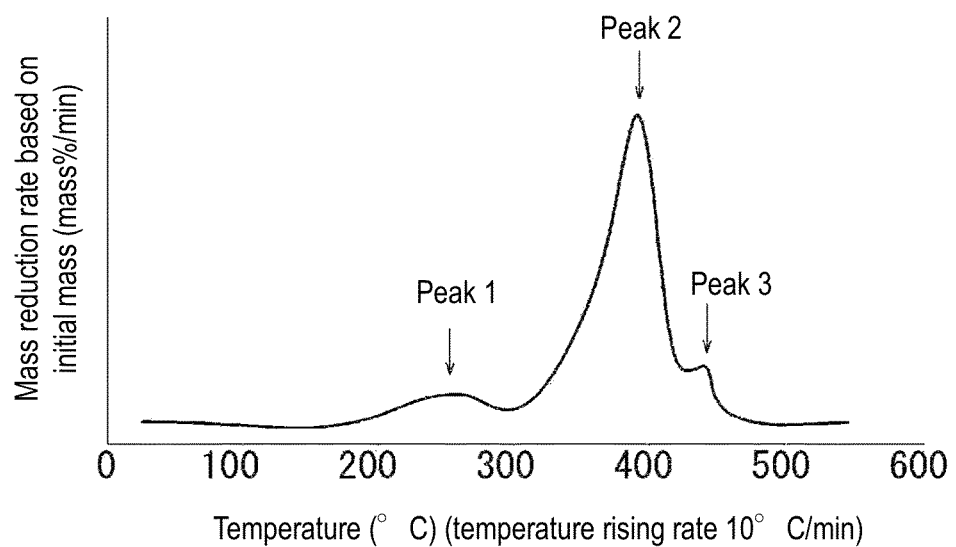
FIG. 2 is a schematic diagram of a TGA curve when a three-dimensional object is heated under a nitrogen atmosphere at a temperature rising rate of 10° C./min.

FIG. 2 shows a schematic diagram of a TGA curve when a three-dimensional object having a certain composition is heated under a nitrogen atmosphere at a temperature rising condition of 10° C./min. The horizontal axis represents the temperature (° C.), and the vertical axis represents the mass reduction rate (mass %/min) based on the initial weight. This curve has three peaks as indicated by arrows in the drawing. These three peaks indicate that the three-dimensional object contains three types of organic components having different degreasing temperatures. Note that the temperatures at which these organic components start to be degreased do not coincide with the temperatures corresponding the peaks in the drawing, and are generally lower than these temperatures and considered to be around the rising temperatures of the respective peaks. In FIG. 2, the degreasing start temperature of the organic component corresponding to the peak 1 is considered to be about 200° C., the degreasing start temperature of the organic component corresponding to the peak 2 is considered to be about 310° C., and the degreasing start temperature of the organic component corresponding to the peak 3 is considered to be about 420° C. In this case, the degreasing step may be performed at these temperatures.

The degreasing start temperature of each organic component contained in the three-dimensional object can be determined by thermogravimetry.

In each step SDk, instead of heating at the constant heating temperature Tk, heating may be performed in a predetermined temperature range such that the average heating temperature is the heating temperature Tk. For example, in certain step SDk, the temperature may be raised at a constant temperature rising rate or lowered at a constant temperature lowering rate in a temperature range of the heating temperature Tk±50° C., the heating temperature Tk±40° C., the heating temperature Tk±30° C., the heating temperature Tk±20° C., the heating temperature Tk±10° C., or the heating temperature Tk±5° C. such that the average heating temperature is the heating temperature Tk. At this time, the absolute value of the temperature rising rate or the temperature lowering rate in step SDk is desirably sufficiently smaller than the absolute value of the temperature rising rate between steps SD1 to SDk (or the slowest temperature rising rate if there is a plurality of temperature rising rates). The absolute value of the temperature rising rate or the temperature lowering rate in step SDk is preferably, for example, smaller than 50%, 40%, 30%, 20%, 10%, or 5% of the temperature rising rate between steps SD1 to SDk. The average heating temperature can be calculated by dividing the integrated value of the heating temperatures during heating by the time required for heating. Similarly, in the sintering step, heating may be performed not at a constant sintering temperature but in a predetermined temperature range such that the average sintering temperature is the above-described sintering temperature.

Examples

The 3D inkjet printer ink was prepared, and a rectangular parallelepiped of 5 cm×5 cm×5 cm was formed by an inkjet printer (UV curing inkjet type full color 3D printer, 3DUJ-553, manufactured by Mimaki Engineering Co., Ltd.).

The 3D inkjet printer ink was prepared by mixing the following materials:

38.8 parts of high-purity alumina (manufactured by Sumitomo Chemical Co., Ltd., AKP-53, median particle size: 0.18 μm) having a small particle size as a ceramic component (pigment);

0.91 parts of an active polymer dispersant (manufactured by Lubrizol Corporation, trade name: SOLSPERSE 36000, pour point: 40° C., boiling point: about 200° C., flash point: about 200° C., density: 1.05 g/cm$^3$) as a dispersant;

8.3 parts of an aliphatic polyester-based urethane acrylate oligomer (manufactured by Sartomer, trade name: CN968, number of functional groups: 6, density: 1.2 g/cm$^3$) as an oligomer of a binder component;

12.4 parts of benzyl acrylate (BZA) and 32.8 parts of phenoxyethyl acrylate (PEA) as monomers of a binder component;

0.50 parts of phenylbis(2,4,6-trimethylbenzoyl)phosphine oxide (manufactured by Ciba Specialty Chemicals, trade name: Irg 819) and 4.66 parts of 2,4,6-trimethylbenzoyl-diphenyl-phosphine oxide (manufactured by BASF SE, trade name: Irgacure-TPO) as a phosphine oxide-based initiator of a photopolymerization initiator;

1.58 parts of 2,4-diethylthioxanthene-9-one (DETX) as a thioxanthone-based sensitizer of a sensitizer;

0.04 parts of 2,5-di-tert-butylhydroquinone (manufactured by Seiko Chemical Co., Ltd., trade name: NONFLEX Alba) as a polymerization inhibitor; and 0.046 parts of fully crosslinked silicone polyether acrylate (manufactured by Evonik Resource Efficiency GmbH, trade name: TEGO RAD 2100, short chain siloxane backbone/long chain organic modified highly crosslinked additive) as a radiation curable additive.

Figure 3:
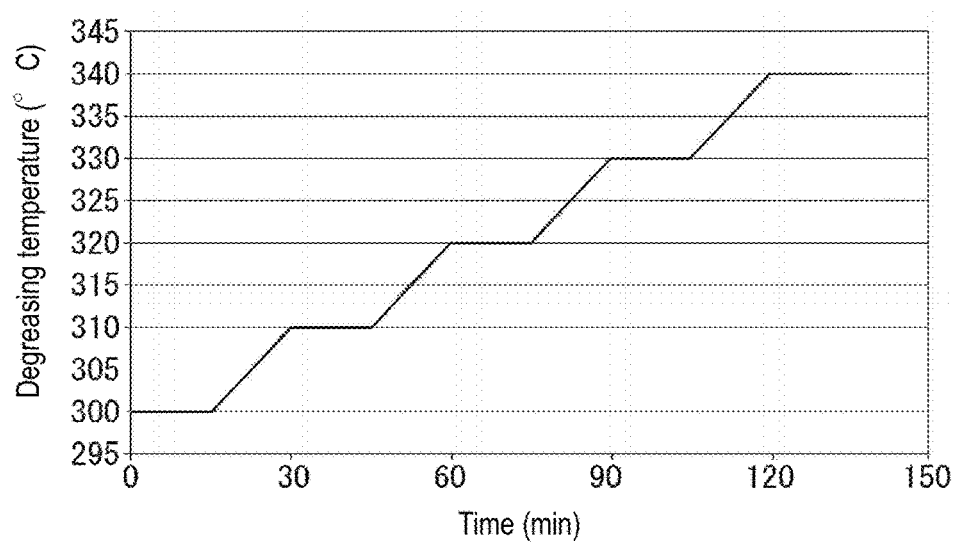
FIG. 3 is a graph showing degreasing conditions in Examples.

The rectangular parallelepiped was degreased and sintered under the following conditions by an electric furnace (Tanman tube atmosphere electric furnace S7T-2025D-SP, manufactured by Motoyama Co., Ltd) to obtain a sintered product E10. The degreasing conditions are also shown in FIG. 3. The temperature rising rate between the steps was 40° C./h.

(1) First Degreasing Step
Atmosphere: nitrogen
Degreasing temperature: 300° C.
Degreasing time: 15 minutes (2) Second Degreasing Step
Atmosphere: nitrogen
Degreasing temperature: 310° C.
Degreasing time: 15 minutes
(3) Third Degreasing Step
Atmosphere: nitrogen
Degreasing temperature: 320° C.
Degreasing time: 15 minutes
(4) Fourth Degreasing Step
Atmosphere: nitrogen
Degreasing temperature: 330° C.
Degreasing time: 15 minutes
(5) Fifth Degreasing Step
Atmosphere: nitrogen
Degreasing temperature: 340° C.
Degreasing time: 15 minutes
(6) Sintering Step
Atmosphere: nitrogen
Sintering temperature: 1,600° C.
Sintering time: 6 hours No defect was observed in the sintered product E10.

Hereinafter, an ink according to an embodiment of the present invention will be described.

Among the sintered products described above, the following 3D inkjet printer ink is used particularly for manufacturing of a ceramic product. Specifically, a 3D shaping inkjet ink containing a ceramic component and a curable binder component is used.

The curable binder component is a component that can be degreased at a degreasing percentage at which the shape of the degreased body is maintained when a 3D object formed by curing the 3D shaping inkjet ink is degreased to obtain a degreased body. The curable binder component contains a plurality of types of polymerizable compounds. The plurality of types of polymerizable compounds are more preferably components with which the 3D object shrinks without cracking when the 3D object is degreased.

Hereinafter, manufacturing of a ceramic product by using the 3D shaping inkjet ink will be described with reference to FIGS. 4 to 9. In the following description, the 3D shaping inkjet ink is also referred to as "ink B".

Although a case of manufacturing a columnar ceramic product having a columnar cavity formed therein will be described, according to the present invention, not only the columnar ceramic product but also a ceramic product of any form can be manufactured in the same manner.

Figure 5:
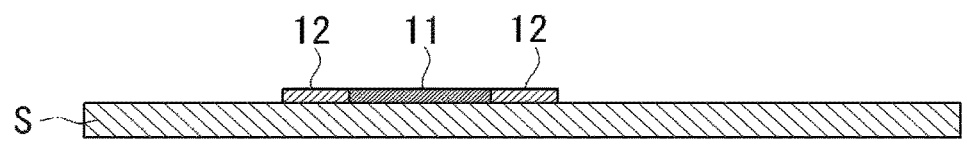
FIG. 5 is a cross-sectional view of one support material layer and one ceramic layer formed in a manufacturing process for a ceramic product.

In this manufacturing method for a ceramic product, for example, the ink A and the ink B are ejected to a stage S from an inkjet head module (not shown) (see, FIG. 5).

Here, the ink A is an ink containing a support material and a curable binder component. The ink B is an ink containing a ceramic component and a curable binder component.

Thereafter, each ejected ink is irradiated with, for example, ultraviolet to cure each ink. As a result, as shown in FIG. 5, one layer of a support material layer 11, in which the ink A has been cured, and one layer of a ceramic layer 12, in which the ink B has been cured, are formed. The irradiation timing of the ultraviolet is arbitrary, and may be after the ink A and the ink B for one layer are ejected, or may be in the middle of ejecting the ink A and the ink B for one layer. In this embodiment, the support material layer 11 is located at the center, and the ceramic layer 12 is formed on the outer side thereof.

Figure 6:
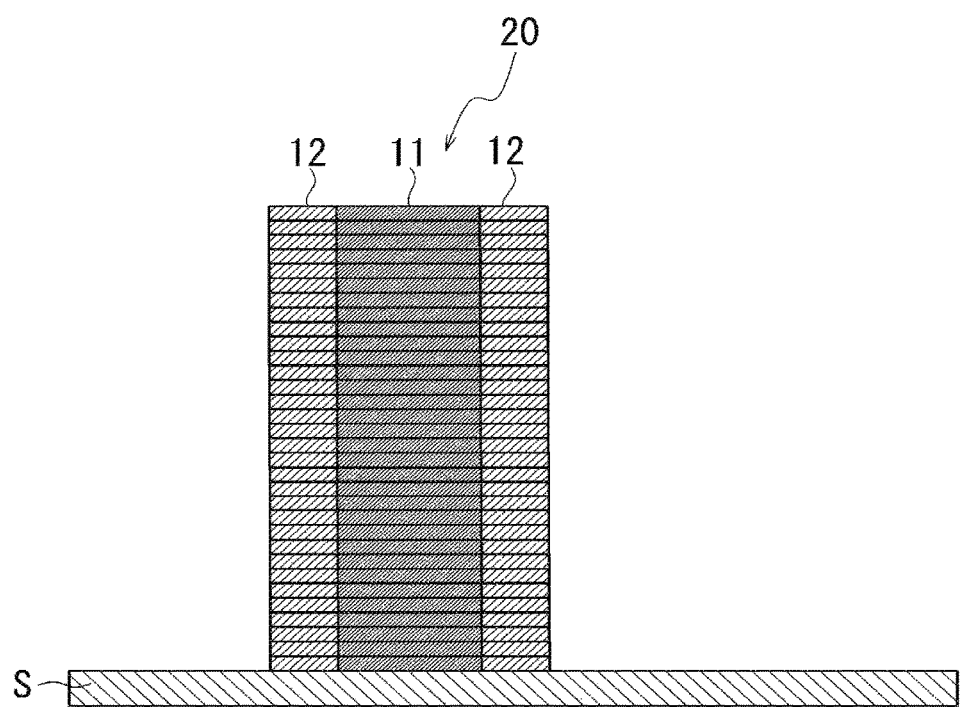
FIG. 6 is a cross-sectional view of a multilayered body formed in a manufacturing process for a ceramic product.
Figure 7:
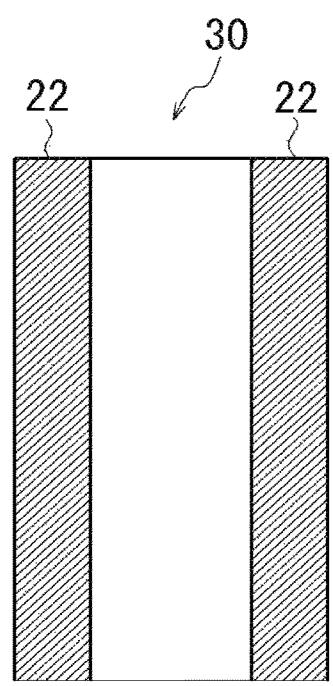
FIG. 7 is a cross-sectional view of a 3D object formed in a manufacturing process for a ceramic product.

Thereafter, the ejection of the ink A and the ink B and the irradiation with ultraviolet are repeated to form the ceramic layers 12. Each time one layer is formed, the layer may be flattened with a roller or the like. The layer adheres to the underlying layer by curing of the ink. A multilayered body 20 obtained by forming the entire layers in this manner is shown in FIG. 6. The multilayered body 20 includes: a support body 21 formed by forming the support material layers 11 (layers of cured ink A); and a cylindrical ceramic body 22 formed by forming the ceramic layers 12 (layers of cured ink B). In FIG. 6, one entire layer is indicated by fine lines in the multilayered body 20.

Thereafter, the multilayered body 20 is separated from the stage S and immersed in a solvent to dissolve and remove the support body 21. As a result, a 3D object 30 (see, FIG. 7) having the cylindrical ceramic body 22 is obtained. The 3D object 30 preferably has a strength capable of maintaining the shape to such an extent that degreasing and sintering operations described later can be performed. Specifically, the flexural strength of the degreased body is preferably 1 MPa or more.

Next, the 3D object 30 is degreased to obtain a degreased body. In degreasing, for example, heating is performed in a nitrogen atmosphere by raising the temperature stepwise at a predetermined temperature, for example, in a range of 100° C. or higher and 340° C. or lower. By this heating step, the cured body formed by curing of the curable binder component in the ink B is volatilized or volatilized after being thermally decomposed.

The residual amount of the cured body in the ceramic body 22 gradually decreases by heating. The degree of degrease varies depending on the binder component to be used and the heating temperature. For example, when the maximum temperature of degreasing is set to 340° C., the degreasing percentage can be set to about 85% (the residual amount of the cured body is about 15%). The degreasing percentage is not particularly limited, but is preferably in a range of 80% or more and 90% or less, and more preferably in a range of 83% or more and 88% or less. When the degreasing percentage is in this range, the shape of the degreased body is maintained, and cracks and the like are less likely to occur in the sintering operation described later.

In the degreased body after degreasing, the shape of the 3D object 30 is maintained by the remaining cured body, and for example, the size of the 3D object 30 shrinks substantially uniformly at about 63% to about 74% in dimension. The dimensional change of each of the X axis, the Y axis, and the Z axis may be different by about 10%, but for example, the difference in shrinkage percentage among the X axis, the Y axis, and the Z axis including the difference in shrinkage at the time of firing is calculated in advance to determine the dimension of the 3D object 30, whereby a sintered body having a desired dimension is obtained.

The degreased body preferably has a strength capable of maintaining the shape to such an extent that the sintering operation described later can be performed. Specifically, the flexural strength of the degreased body is preferably 1 MPa or more.

Then, the degreased body is fired at a predetermined temperature, for example, 1,200° C. or higher and 1,250° C. or lower under an air atmosphere to obtain a ceramic product. The strength required for the sintered body varies depending on the intended purpose, but for example, the flexural strength of the sintered body is preferably 300 MPa or more.

The 3D shaping inkjet ink according to an embodiment of the present invention contains a ceramic component and a curable binder component.

(Ceramic Component)

The ceramic component used in the present embodiment is not particularly limited as long as it is a nonmetallic inorganic solid material, and can be appropriately selected from natural minerals such as porcelain, feldspar, and clay, in addition to alumina, zirconia, zircon, forsterite, mullite, steatite, cordierite, silicon carbide, aluminum nitride, and the like.

The shape of the ceramic component is not particularly limited, but for example, particles are preferable from the viewpoint of dispersibility in the ink. The particle size of the ceramic component is not particularly limited as long as it is within a range that can be ejected by inkjet. The particle size is preferably 0.01 µm or more and 1 µm or less, more preferably 0.1 µm or more and 0.6 µm or less, and still more preferably 0.4 µm or more and 0.5 µm or less in terms of the median particle size from the viewpoint of the ejectability of the ink and the strength of the 3D object.

As the ceramic component, for example, AKP-20 (median particle size: 0.46 µm), AKP-30 (median particle size: 0.27 µm), AKP-50 (median particle size: 0.20 µm), AKP-53 (median particle size: 0.18 µm), and AKP-3000 (median particle size: 0.70 µm) manufactured by Sumitomo Chemical Co., Ltd. can be used.

The content of the ceramic component in the 3D shaping inkjet ink is not particularly limited, but is preferably 10 vol % or more and 50 vol % or less, more preferably 15 vol % or more and 40 vol % or less, still more preferably 20 vol % or more and 35 vol % or less, and particularly preferably 25 vol % or more and 32 vol % or less in terms of volume concentration. Furthermore, the content of the ceramic component in the ink is preferably 30 mass % or more and 80 mass % or less, more preferably 40 mass % or more and 75 mass % or less, still more preferably 50 mass % or more and 70 mass % or less, and particularly preferably 55 mass % or more and 65 mass % or less in terms of mass concentration. When the content is less than the upper limit, it is preferable from the viewpoint of the ejectability, physical properties, stability, and the like of the ink, and when the content is more than the lower limit, it is preferable from the viewpoint of the strength of the 3D object to be obtained.

(Curable Binder Component)

The curable binder component according to the present embodiment contains a plurality of types of polymerizable compounds. Furthermore, when a degreased body is obtained by degreasing a 3D object formed by curing the 3D shaping inkjet ink, the curable binder component can be degreased at a degreasing percentage at which the shape of the degreased body is maintained.

The polymerizable compound is not particularly limited as long as it is a compound having polymerizability, and examples thereof include the following compounds. Acrylates such as methyl acrylate, ethyl acrylate, propyl acrylate, butyl acrylate, i-butyl acrylate, t-butyl acrylate, octyl acrylate, cyclohexyl acrylate, and benzyl.

Methacrylates such as methyl methacrylate, ethyl methacrylate, propyl methacrylate, butyl methacrylate, i-butyl methacrylate, t-butyl methacrylate, octyl methacrylate, cyclohexyl methacrylate, and benzyl methacrylate.

Alkyl vinyl ethers such as methyl vinyl ether, ethyl vinyl ether, and butyl vinyl ether.

Styrene derivatives such as styrene, α-methylstyrene, o-methylstyrene, m-methylstyrene, p-methylstyrene, and vinylnaphthalene.

Alkyl vinyl esters such as vinyl formate, vinyl acetate, vinyl butyrate, vinyl caproate, and vinyl stearate.

Monomers of unsaturated compounds such as crotonic acid, maleic acid, fumaric acid, itaconic acid, acrylonitrile, methacrylonitrile, vinyl chloride, vinylidene chloride, acrylamide, and methacrylamide, and oligomers thereof. Among them, acrylate and acrylate oligomers are preferable as the polymerizable compound in terms of polymerizability, solubility of an initiator and/or sensitizer, and the like. The acrylate oligomer is more preferably a urethane acrylate oligomer, and is particularly preferably an aliphatic polyester-based urethane acrylate oligomer.

The curable binder component according to the present embodiment contains a plurality of types of such polymerizable compounds. The combination of the polymerizable compounds is not particularly limited as long as it is a combination of two different types of polymerizable compounds. Examples of the combination include a combination of a monomer and an oligomer, a combination of a monofunctional polymerizable compound and a polyfunctional polymerizable compound, and a combination of a monomer and an oligomer, which is also a combination of a monofunctional polymerizable compound and a polyfunctional polymerizable compound at the same time.

Here, in the present specification, the "monomer" refers to a low molecular weight compound serving as a raw material in synthesizing a polymer. In addition, the "oligomer" refers to a molecule in which one or several types of atoms or atomic groups (constituent units) are repeatedly linked to one another, and the physical properties thereof change depending on the increase or decrease of one or several constituent units. Examples of the oligomer include dimer, trimer, and tetramer.

In addition, in the present specification, the "monofunctional polymerizable compound" refers to a polymerizable compound having only one polymerizable functional group (for example, an acryloyl group) included in the organic compound. In addition, the "polyfunctional polymerizable compound" refers to a compound having two or more polymerizable functional groups included in the polymerizable compound. The polyfunctional polymerizable compound includes a case where two or more functional groups of the same type are present and a case where different types of functional groups are present in the same molecule.

Therefore, examples of the plurality of types of polymerizable compounds according to the present embodiment include a combination of a monomer of a monofunctional polymerizable compound and a monomer of a polyfunctional polymerizable compound, a combination of an oligomer of a monofunctional polymerizable compound and an oligomer of a polyfunctional polymerizable compound, a combination of a monomer of a monofunctional polymerizable compound and a monomer of a polyfunctional polymerizable compound, and a combination of an oligomer of a monofunctional polymerizable compound and an oligomer of a polyfunctional polymerizable compound.

In addition to acrylates, methacrylates, alkyl vinyl ethers, and monomers of unsaturated compounds mentioned as examples of the polymerizable compound, examples of the monofunctional monomer include monofunctional acrylates such as benzyl acrylate (abbreviation: BZA), 2-(2-ethoxyethoxy)ethyl acrylate, stearyl acrylate, tetrahydrofurfuryl acrylate, lauryl acrylate, 2-phenoxyethyl acrylate (abbreviation: PEA), 2-(2-ethoxyethoxy)ethyl acrylate (abbreviation: EOEOEA), isodecyl acrylate, isooctyl acrylate, tridecyl acrylate, caprolactone acrylate, and isobonyl acrylate; and monofunctional methacrylates such as tetrahydrofurfuryl methacrylate, isodecyl methacrylate, lauryl methacrylate, stearyl methacrylate, 2-phenoxyethyl methacrylate, isobornyl methacrylate, tridecyl methacrylate, methoxypolyethylene glycol, monomethacrylate, methoxypolyethylene glycol, and polypropylene glycol monomethacrylate.

Examples of the monofunctional monomer that can be used include phenol EO-modified (n=2) acrylate (trade name: Miramer M142, abbreviation: Ph(EO)2A, molecular weight: 236), phenol EO-modified (n=4) acrylate (trade name: Miramer M144, abbreviation: Ph(EO)4A, molecular weight: 324), nonylphenol EO-modified (n=8) acrylate (trade name: Miramer M166, abbreviation: NP(EO)8A, molecular weight: 626), and ethoxydiethylene glycol acrylate (trade name: Miramer M170, abbreviation: EOEOEA, molecular weight: 188), manufactured by Miwon Specialty Chemical Co., Ltd.

Examples of the bifunctional monomer include bifunctional acrylates such as 1,3-butylene glycol diacrylate, 1,4-butanediol diacrylate, diethylene glycol diacrylate, 1,6-hexanediol diacrylate, polyethylene glycol (200) diacrylate, tetraethylene glycol diacrylate, triethylene glycol diacrylate, tripropylene glycol diacrylate, polyethylene glycol (400) diacrylate, dipropylene glycol diacrylate, alkoxylated hexanediol diacrylate, ethoxylated (4) bisphenol A diacrylate, ethoxylated (10) bisphenol A diacrylate, polyethylene glycol (600) diacrylate, tricyclodecane dimethanol diacrylate, and propoxylated (2) neopentyl glycol diacrylate; and bifunctional methacrylates such as triethylene glycol dimethacrylate, ethylene glycol dimethacrylate, tetraethylene glycol dimethacrylate, polyethylene glycol dimethacrylate, 1,4-butanediol dimethacrylate, diethylene glycol dimethacrylate, 1,6-hexanediol dimethacrylate, neopentyl glycol dimethacrylate, polyethylene glycol (600) dimethacrylate, 1,3-butylenediol dimethacrylate, ethoxylated (2) bisphenol A dimethacrylate, ethoxylated (10) bisphenol A dimethacrylate, ethoxylated bisphenol A dimethacrylate, ethoxylated bisphenol A dimethacrylate, ethoxylated bisphenol A dimethacrylate, polyethylene glycol (400) dimethacrylate, polypropylene glycol (400) dimethacrylate, and ethoxylated (30) bisphenol A dimethacrylate.

Examples of the bifunctional monomer that can be used include hexanediol diacrylate (trade name: Miramer M200, abbreviation: HDDA, molecular weight: 226), hexanediol EO-modified diacrylate (trade name: Miramer M202, abbreviation: HD(EO)DA, molecular weight: 314), hydroxypivalic acid neopentyl glycol diacrylate (trade name: Miramer M210, abbreviation: HPNDA, molecular weight: 312), neopentyl glycol PO-modified (n=2) diacrylate (trade name: Miramer M216, abbreviation: NPG(PO)2DA, molecular weight: 328), tripropylene glycol diacrylate (trade name: Miramer M220, abbreviation: TPGDA, molecular weight: 300), dipropylene glycol diacrylate (trade name: Miramer M222, abbreviation: DPGDA, molecular weight: 242), bisphenol A EO-modified (n=4) diacrylate (trade name: Mirmaer M240, abbreviation: BPA(EO)4DA, molecular weight: 512), bisphenol A EO-modified (n=10) diacrylate (trade name: Miramer M2100, abbreviation: BPA(EO)10 DA, molecular weight: 770), polyethylene glycol (molecular weight: 400) diacrylate (abbreviation: PEG400DA, trade name: Miramer M280, abbreviation: PEG400DA, molecular weight: 508), polyethylene glycol (molecular weight: 300) diacrylate (abbreviation: PEG300DA, trade name: Miramer M284, abbreviation: PEG300DA, molecular weight: 408), polypropylene glycol diacrylate (trade name: Miramer M2040, abbreviation: PPG400DA, molecular weight: 548), manufactured by Miwon Specialty Chemical Co., Ltd, and a phenyl glycidyl ether acrylate hexamethylene diisocyanate urethane prepolymer (trade name: AH-600, monomer) manufactured by Kyoeisha Chemical Co., Ltd.

Examples of the trifunctional monomer include trifunctional acrylates such as trimethylolpropane triacrylate, tris(2-hydroxyethyl)isocyanurate triacrylate, ethoxylated trimethylolpropane triacrylate, pentaerythritol triacrylate, ethoxylated (3) trimethylolpropane triacrylate, propoxylated (3) trimethylolpropane triacrylate, ethoxylated (6) trimethylolpropane triacrylate, propoxylated (6) trimethylolpropane triacrylate, ethoxylated (9) trimethylolpropane triacrylate, propoxylated (3) glyceryl triacrylate, highly propoxylated (5.5) glyceryl triacrylate, and ethoxylated (15) trimethylolpropane triacrylate; and trifunctional methacrylates such as trimethylolpropane trimethacrylate.

Examples of the trifunctional monomer that can be used include trimethylolpropane triacrylate (trade name: Miramer M300, abbreviation: TMPTA, molecular weight: 296), trimethylolpropane EO-modified (n=3) triacrylate (trade name: Miramer M3130, abbreviation: IMP(EO)3TA, molecular weight: 428), trimethylolpropane PO-modified (n=3) triacrylate (trade name: Miramer M360, abbreviation: TMP(PO)3TA, molecular weight: 470), glycerin propoxy triacrylate (trade name: Miramer M320), pentaerythritol triacrylate (trade name: Miramer M340), pentaerythritol EO-modified tetraacrylate (trade name: Miramer M4004), ditrimethylolpropane tetraacrylate (trade name: Miramer M410), dipentaerythritol hexaacrylate (trade name: Miramer M600, abbreviation: DPHA, molecular weight: 578), trimethylolpropane EO-modified triacrylate (trade name: Miramer M3160, abbreviation: TMP(EO)6TA, molecular weight: 560), trimethylolpropane EO-modified triacrylate (trade name: Miramer M3190, abbreviation: TMP(EO)9TA, molecular weight: 692), trimethylolpropane PO-modified triacrylate (trade name: Miramer M360, abbreviation: TMP(PO)3TA, molecular weight: 470), glycerin propoxy triacrylate (trade name: Miramer M320, abbreviation: GPTA, molecular weight: 428), pentaerythritol triacrylate (trade name: Miramer M340, abbreviation: PETA, molecular weight: 298), manufactured by Miwon Specialty Chemical Co., Ltd, and a glycerin triacrylate monomer (trade name: ARONIX MT-3547) manufactured by Toagosei Co., Ltd.

Examples of the tetra- or higher functional monomer include tetrafunctional acrylates such as pentaerythritol tetraacrylate, ditrimethylolpropane tetraacrylate, and ethoxylated pentaerythritol tetraacrylate; and pentafunctional acrylates such as dipentaerythritol pentaacrylate.

Examples of the tetra- or higher functional monomer that can be used include trimethylolpropane EO-modified (n=6) triacrylate (trade name: Miramer M3160), trimethylolpropane EO-modified (n=9) triacrylate (trade name: Miramer M3190), pentaerythritol EO-modified tetraacrylate (trade name: Miramer M4004, abbreviation: PE(EO)TTA, molecular weight: 572), ditrimethylolpropane tetraacrylate (trade name: Miramer M410, abbreviation: DTMPTTA, molecular weight: 467), and dipentaerythritol hexaacrylate (trade name: Miramer M600, abbreviation: DPHA, molecular weight: 578), manufactured by Miwon Specialty Chemical Co., Ltd.

Examples of the bifunctional oligomer include epoxy acrylate oligomers such as a bisphenol A epoxy diacrylate oligomer (trade name: Miramer PE210, molecular weight: 520), an aliphatic epoxy diacrylate oligomer (trade name: Miramer PE230, molecular weight: 420), a modified epoxy diacrylate oligomer (trade name: Miramer EA2280, molecular weight: 1580); an epoxy acrylate oligomer (trade name: Miramer WS2100, molecular weight: 720), manufactured by Miwon Specialty Chemical Co., Ltd; a urethane acrylate oligomer (trade name: Miramer WS2600, molecular weight: 7,200), manufactured by Miwon Specialty Chemical Co., Ltd; and urethane acrylate oligomers such as an aliphatic urethane acrylate EO-TMPTA blend (trade name: CN961E75, density: 1.094 g/cm$^3$), an aliphatic urethane acrylate EOEOEA blend (trade name: CN961H81, density: 1.083 g/cm³), aliphatic urethane acrylate (trade name: CN962, density: 1.105 g/cm³), aliphatic urethane acrylate (trade name: CN963, density: 1.102 g/cm³), an aliphatic urethane acrylate TPGDA blend (trade name: CN963A80, density: 1.094 g/cm³), an aliphatic urethane acrylate HDDA blend (trade name: CN963B80, density: 1.091 g/cm³), an aliphatic urethane acrylate EO-TMPTA blend (trade name: CN963E75, density: 1.103 g/cm³), an aliphatic urethane acrylate EO-TMPTA blend (trade name: CN963E80, density: 1.105 g/cm³), an aliphatic urethane acrylate IBOA blend (trade name: CN963J85, density: 1.089 g/cm³), aliphatic urethane acrylate (trade name: CN964, density: 1.103 g/cm³), an aliphatic urethane acrylate EO-TMPTA blend (trade name: CN964E75, density: 1.089 g/cm³), an aliphatic urethane acrylate TPGDA blend (trade name: CN964A85, density: 1.096 g/cm³), aliphatic urethane acrylate (trade name: CN965, density: 1.098 g/cm³), an aliphatic urethane acrylate TPGDA blend (trade name: CN965A80, density: 1.078 g/cm³), an aliphatic urethane acrylate TPGDA blend (trade name: CN966A80, density: 1.074 g/cm³), an aromatic urethane acrylate TPGDA blend (trade name: CN973A80, density: 1.094 g/cm³), an aromatic urethane acrylate EOEOEA blend (trade name: CN973H85, density: 1.071 g/cm³), and an aromatic urethane acrylate IBOA blend (trade name: CN973J75, density: 1.048 g/cm³), manufactured by Sartomer.

Examples of the trifunctional oligomer that can be used include urethane acrylate oligomers such as an aliphatic urethane acrylate oligomer (trade name: Miramer PU340, molecular weight: 2,400) manufactured by Miwon Specialty Chemical Co., Ltd, aliphatic urethane acrylate (trade name: CN929, density: 1.114 g/cm³) manufactured by Sartomer, an aromatic urethane acrylate TPGDA blend (trade name: CN970A60, density: 1.140 g/cm³), an aromatic urethane acrylate EO-TMPTA blend (trade name: CN970E60, density: 1.147 g/cm³), aromatic urethane acrylate (trade name: CN971, density: 1.095 g/cm³), an aromatic urethane acrylate TPGDA blend (trade name: CN971A80, density: 1.118 g/cm³), and aromatic urethane acrylate (trade name: CN972, density: 1.052 g/cm³).

Examples of the tetrafunctional oligomer include a urethane acrylate oligomer (trade name: PU4300, molecular weight: 850), polyester acrylate (trade name: Miramer PS420, molecular weight: 3,000), and urethane acrylate (trade name: Miramer WS4000, molecular weight: 7,600), manufactured by Miwon Specialty Chemical Co., Ltd., and among them, a urethane acrylate oligomer (trade name: PU4300, molecular weight: 850) is preferable.

Examples of the hexafunctional oligomer that can be used include an aliphatic urethane acrylate oligomer (trade name: Miramer PU610, molecular weight: 1,800) manufactured by Miwon Specialty Chemical Co., Ltd, an aliphatic polyester-based urethane acrylate oligomer (trade name: CN968, density: 1.2 g/cm³), and aromatic urethane acrylate (trade name: CN975, density: 1.181 g/cm³), both manufactured by Sartomer. Among them, an aliphatic polyester-based urethane acrylate oligomer (trade name: CN968, density: 1.2 g/cm³) manufactured by Sartomer is preferable.

Examples of the decafunctional oligomer that can be used include an aliphatic urethane acrylate oligomer (trade name: Miramer MU9500, molecular weight: 3,200) manufactured by Miwon Specialty Chemical Co., Ltd.

Examples of the pentadecafunctional oligomer that can be used include an aliphatic urethane acrylate oligomer (trade name: Miramer SC2152, molecular weight: 20,787) manufactured by Miwon Specialty Chemical Co., Ltd, and a pentaerythritol triacrylate hexamethylene diisocyanate urethane prepolymer (trade name: UA-306H) manufactured by Kyoeisha Chemical Co., Ltd.

Among these monomers and oligomers, a combination of a hexafunctional aliphatic polyester-based urethane acrylate oligomer and a benzyl acrylate monomer (abbreviation: BZA), a combination of a hexafunctional aliphatic polyester-based urethane acrylate oligomer, a benzyl acrylate monomer (abbreviation: BZA), and 2-phenoxyethyl acrylate (abbreviation: PEA), and a combination of a hexafunctional aliphatic polyester-based urethane acrylate oligomer, a benzyl acrylate monomer, and 2-(2-ethoxyethoxy)ethyl acrylate (abbreviation: EOEOEA) are preferable.

(Other Components)

The 3D shaping inkjet ink according to the present embodiment may further contain other components as long as the effects of the present invention are not impaired. Examples of the other component include an initiator, a sensitizer, a dispersant, a polymerization inhibitor, a surface regulator, a coloring material, an antioxidant, an anti-aging agent, a solvent, a surfactant, a filler, a plasticizer, a flame retardant, a leveling agent, an antifoaming agent, a charge imparting agent, a disinfectant, an antiseptic agent, a deodorant, a charge adjusting agent, a wetting agent, an anti-skinning agent, and a fragrance.

(Initiator)

The initiator generates an active species by heating or irradiation with light, and cures the polymerizable compound. Examples of the initiator include a thermal radical polymerization initiator, a thermal cationic polymerization initiator, a photoradical polymerization initiator, a photocationic polymerization initiator, and a photoanionic polymerization initiator, and among them, a photoradical polymerization initiator is preferable. Examples of the photoradical polymerization initiator include phosphine oxide-based initiators, and among them, a phosphine oxide-based initiator is preferable.

The phosphine oxide-based initiator is a phosphine oxide compound represented by Formula (1) below:

[Chemical Formula 1]

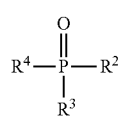

(1)

where R2, R3, and R4 each independently represent hydrogen, or a hydrocarbon group having a substituent or an unsubstituted hydrocarbon group.

Specifically, examples of R2, R3, and R4 each independently include a phenyl group and an acyl group.

More specifically, examples of the phosphine oxide-based initiator include 2,4,6-trimethylbenzoyl-diphenylphosphine oxide represented by Formula (2) below:

[Chemical Formula 2]

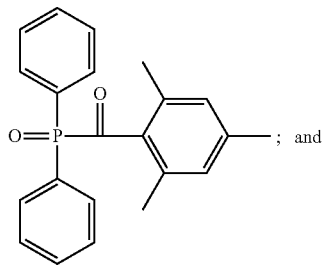

(2)

; and bis(2,4,6-trimethylbenzoyl)phenylphosphine oxide represented by Formula (3) below:

[Chemical Formula 3]

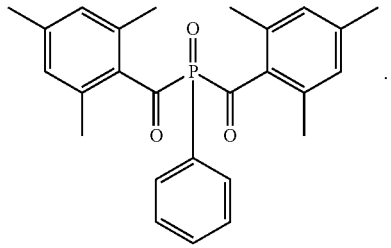

(3)

The phosphine oxide-based initiator is preferably an acylphosphine oxide-based photopolymerization initiator, and more preferably 2,4,6-trimethylbenzoyl-diphenylphosphine oxide and bis(2,4,6-trimethylbenzoyl)phenylphosphine oxide.

Examples of the phosphine oxide-based initiator that can be used include 2,4,6-trimethylbenzoyl-diphenylphosphine oxide (trade name: Omnirad TPO H (former trade name: Irgacure TPO, BASF SE)) and bis (2,4,6-trimethylbenzoyl) phenylphosphine oxide (trade name: Omnirad 819 (former trade name: Irgacure 819, BASF SE), both manufactured by IGM Resins. The phosphine oxide-based initiator may be used singly or in combination of two or more types thereof.

The content of the initiator in the 3D shaping inkjet ink is not particularly limited, but is preferably 1 mass % or more and 15 mass % or less, more preferably 4 mass % or more and 8 mass % or less, and still more preferably 6 mass % or more and 7 mass % or less.

(Sensitizer)

The sensitizer imparts photosensitivity in a wavelength range in which the initiator does not have photosensitivity, to the initiator, or increases the degree of photosensitivity of the initiator. Examples of the sensitizer include a photocationic sensitizer and a photoradical sensitizer, and a photoradical sensitizer is preferable. Examples of the photoradical sensitizer include an anthracene-based sensitizer and a thioxanthone-based sensitizer, and a thioxanthone-based sensitizer is preferable.

The thioxanthone-based sensitizer according to the present embodiment is a compound having a thioxanthone backbone represented by Formula (4) below.

[Chemical Formula 4]

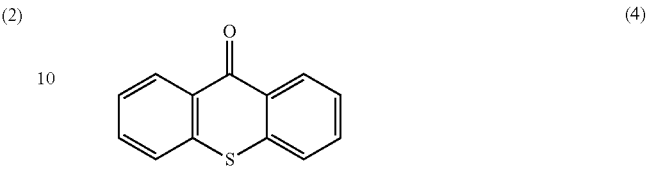

(4)

Examples of the thioxanthone-based sensitizer include unsubstituted thioxanthone, and thioxanthone compounds having a hydrocarbon group such as a methyl group, an ethyl group, or a propyl group as a substituent. Among them, unsubstituted thioxanthone is preferable.

More specifically, examples of the thioxanthone-based sensitizer include thioxanthone, 2,4-diethyl-9H-thioxanthene-9-one, and 2-isopropylthioxanthone.

Examples of the thioxanthone-based sensitizer that can be used include thioxanthone manufactured by Tokyo Chemical Industry Co., Ltd., 2,4-diethyl-9H-thioxanthene-9-one manufactured by Wako Pure Chemical Industries, Ltd., and 2-isopropylthioxanthone manufactured by Tokyo Chemical Industry Co., Ltd. The thioxanthone-based sensitizer may be used singly or in combination of two or more types thereof.

The content of the thioxanthone-based sensitizer in the 3D shaping inkjet ink is not particularly limited, but is preferably 0.1 mass % or more and 10 mass % or less, more preferably 0.5 mass % or more and 3.0 mass % or less, and still more preferably 1.5 mass % or more and 2.5 mass % or less.

(Polymerization Inhibitor)

The polymerization inhibitor is not particularly limited as long as it is a compound that inhibits polymerization, and examples thereof include 4-tert-butylpyrocatechol, tert-butylhydroquinone, 1,4-benzoquinone, dibutylhydroxytoluene, hydroquinone, mequinol, and phenothiazine. More specifically, as the polymerization inhibitor, for example, 2,5-di-tert-butylhydroquinone (trade name: NONFLEX Alba) manufactured by Seiko Chemical Co., Ltd. can be used.

The content of the polymerization inhibitor in the case of using the polymerization inhibitor is preferably 0.1 mass % or more and 10 mass % or less, more preferably 0.5 mass % or more and 5 mass % or less, and still more preferably 0.8 mass % or more and 1.5 mass % or less in the 3D shaping inkjet ink.

(Dispersant)

The dispersant is not particularly limited as long as it can uniformly disperse the ceramic material in the 3D shaping inkjet ink. Examples of the dispersant include low molecular-weight type dispersants such as an anionic low molecular-weight type dispersant, a nonionic low molecular-weight type dispersant, a nonionic low molecular-weight type dispersant, a cationic low molecular-weight type dispersant, and an amphoteric low molecular-weight type dispersant; and polymer type dispersants such as an anionic polymer type dispersant, a nonionic polymer type dispersant, and a cationic polymer type dispersant. In this case, the dispersant is preferably a polymer type dispersant rather than a low molecular-weight type dispersant.

Examples of the polymer type dispersant include pigment dispersants (trade name: SOLSPERSE 74000, 82500, 83500, V350, W200, WV400, J180, 39000, 36000) manufactured by Lubrizol Corporation, and polymer pigment dispersants (trade name: AJISPER PB821, PB822, PB824, PB881, PN411, PA111) manufactured by Ajinomoto Fine-Techno Co., Inc. Among them, a polymer type dispersant (trade name: S36000, SOLSPERSE 36000) and a polymer type dispersant (trade name: S39000, SOLSPERSE 39000) manufactured by Lubrizol Corporation are preferable.

The content of the dispersant in the case of using the dispersant is not particularly limited as long as the ceramic component can be dispersed in the dispersant, but is preferably 1 mass % or more and 30 mass % or less, and more preferably 5 mass % or more and 20 mass % or less in the inkjet ink composition.

(Surface Regulator)

The surface regulator is not particularly limited as long as the surface tension of the 3D shaping inkjet ink can be adjusted, and examples thereof include TEGO RAD2100, TEGO RAD2200, TEGO RAD2250, TEGO RAD2500, and TEGO RAD2700, manufactured by Evonik Industries AG. Among them, fully crosslinked silicone polyether acrylate (trade name: TEGO RAD2100, short chain siloxane backbone/long chain organic modified highly crosslinked additive) as a silicone-based surface regulator is preferable.

The content of the surface regulator in the case of using the surface regulator is not particularly limited as long as the surface tension can be adjusted, but is preferably 0.001 mass % or more and 5 mass % or less, more preferably 0.01 mass % or more and 1 mass % or less, and still more preferably 0.04 mass % or more and 0.1 mass % or less in the inkjet ink composition.

(Coloring Material)

As the coloring material, known dyes and pigments can be used, but inorganic pigments are preferable in that discoloration due to sintering does not occur.

Examples of the inorganic pigment include titanium oxide, zinc white, zinc oxide, lithopone, iron oxide, aluminum oxide, silicon dioxide, kaolinite, montmorillonite, talc, barium sulfate, calcium carbonate, silica, alumina, cadmium red, red iron oxide, molybdenum red, chrome vermilion, molybdate orange, lead yellow, chrome yellow, cadmium yellow, yellow iron oxide, titanium yellow, chromium oxide, viridian, cobalt green, titanium cobalt green, cobalt chrome green, ultramarine, ultramarine blue, Prussian blue, cobalt blue, cerulean blue, manganese violet, cobalt violet, and mica.

The preparation method for the 3D shaping inkjet ink according to the present embodiment is not limited, but the 3D shaping inkjet ink can be prepared by, for example, mixing a ceramic component, a crosslinkable binder component, and other components to be added as necessary, and stirring the mixture by a physical method of dispersing components by a stirrer such as a homogenizer or a colloid mill or an emulsifier, or a physicochemical method of dispersing components by a phase inversion emulsification method, a surfactant phase emulsification method, a phase inversion temperature emulsification method, or the like.

Examples of the mixer include a lead screw type feeder, a three-one motor, a magnetic stirrer, a disper, a homogenizer, a container drive medium mill such as a ball mill, a centrifugal mill, and a planetary ball mill; a high-speed rotation mill such as a sand mill; a medium stirring mill such as a stirring tank type mill; a bead mill, a high-pressure injection mill, and a disper.

The 3D shaping inkjet ink according to the present embodiment can be used for shaping a 3D object by inkjet printing. For example, as described above, ink is ejected with an inkjet head module to form an ink layer, the ink is cured by ultraviolet or the like to form a ceramic layer, and these processes are repeated, thereby forming a 3D object. The thickness of each layer is not particularly limited, but is, for example, preferably 0.1 µm or more and 1 mm or less, more preferably 1 µm or more and 100 µm or less, and still more preferably 10 µm or more and 50 µm or less.

Figure 9:
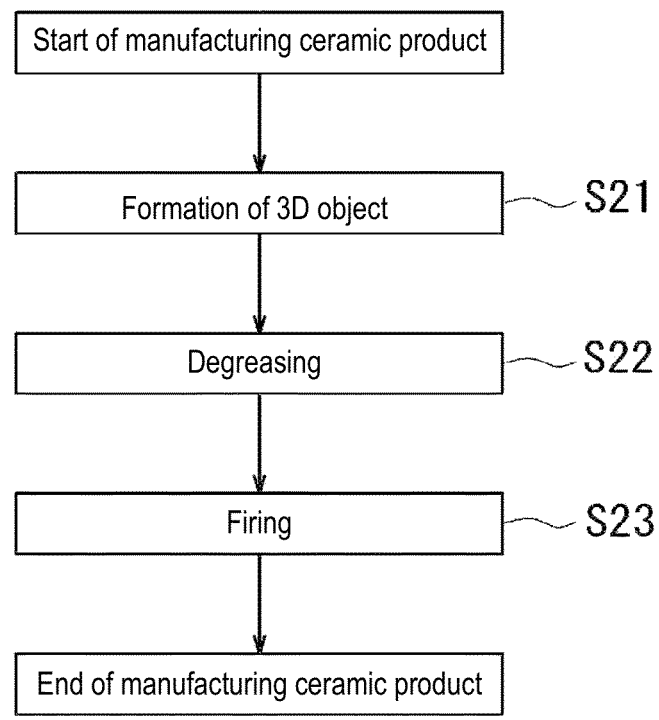
FIG. 9 is a flowchart of a manufacturing method for a ceramic product using ink according to an embodiment of the present invention.

A ceramic product can be manufactured by the manufacturing method shown in FIG. 9 using a 3D object. In the manufacturing method shown in FIG. 9, a 3D object (see, FIGS. 5 to 7) is formed by the shaping method described above (step S21), the 3D object is degreased (step S22), and finally, the degreased body is fired (step S23) to obtain a ceramic product.

By performing degreasing before firing and thereby removing a part of components other than the ceramic component in advance, the occurrence of cracks at the time of firing can be prevented.

The degreasing conditions are not particularly limited, but it is preferable to remove 80 wt % or more and 90 wt % or less (degreasing percentage) of the curable binder component in the 3D shaping inkjet ink. When the degreasing percentage is in this range, the shape can be maintained at the time of degreasing, and the strength at the time of firing the degreased body can be maintained, which is preferable.

The temperature condition at the time of degreasing is not particularly limited, but for example, the temperature can be raised stepwise from room temperature to 320° C. or higher and 350° C. or lower. By increasing the temperature stepwise, it is easy to maintain the shape of the degreased body.

The atmosphere condition at the time of degreasing is not particularly limited, and for example, the degreasing can be performed under an air atmosphere or a nitrogen atmosphere. Degreasing under a nitrogen atmosphere is preferable in that cracking occurred by rapid vaporization due to oxidization of the binder component can be prevented.

A ceramic product is obtained by firing the degreased body. The firing conditions are not particularly limited, but for example, by heating to 1,000° C. or higher under an air atmosphere, the organic component can be removed and the ceramic component can be sintered. More specifically, sintering can be performed at 1,600° C. for 6 hours under an air atmosphere.

Examples

Hereinafter, the present invention will be described based on Examples. The performance test of each ink was performed by the following method.

(Ink Performance; Storability)

Ink was allowed to stand at 60° C. for 30 days, a change in viscosity of the ink was measured, a period until the viscosity change exceeded ±10% was measured, and the storability of the ink was evaluated.

(Ink Performance; Absorbance)

Ink was diluted 10 times with polymethyl acrylate (PMA), and the absorbance (Abs) of the diluted ink at a wavelength of 385 nm was measured.

(Ink Performance; Film Absorbance)

Ink was applied to a PET film (manufactured by Higashiyama Film Co., Ltd., trade name: HK-31WF) with a #8 bar coater, and the absorbance (Abs) at 385 nm was measured.

(Ink Performance; Precipitation Percentage)

The weight of the precipitate was measured.

(Ink Performance; Redispersion Percentage)

The precipitate is mixed with ink and stirred in a test tube mixer. The weight of the precipitate was measured.

(Ink Performance; Formation of Interface with Support Agent)

Ink was applied onto a support agent with a #14 bar coater, photographs were then taken 10 seconds, 60 seconds, and 180 seconds after application, and formation of an interface between the ink and the support agent was evaluated in five scales of 1 (poor) to 5 (good).

(Ink Performance; Abrasion Resistance)

A surface to which ink has been applied was rubbed back and forth 20 times with a cotton swab, and the rubbed surface was evaluated in five scales of 1 (poor) to 5 (good).

(Ink Performance; Warpage)

One layer of ink was applied with a #18 bar coater, and the warpage)(° was measured.

(Ink Performance; Curability)

Ink was applied to a PET film (manufactured by Higashiyama Film Co., Ltd., trade name: HK-31WF) for six passes with a #8 bar coater, and cured with a UV curing inkjet type full color 3D printer (manufactured by Mimaki Engineering Co., Ltd., trade name: 3DUJ-553), and the pencil hardness was measured.

(Ink Performance; Ejectability)

An ejection test was performed using an inkjet head (manufactured by Toshiba Tec Corporation, trade name: CF1BXL) with continuous ejection (1 drop, 5 drop) and intermittent ejection (1 drop, 5 drop) at each ink temperature, upstream pressure, downstream pressure, and voltage.

(Characteristics of 3D Object; Warpage)

The dimension of the 3D object was measured.

(Characteristics of 3D Object; Solid Specific Gravity)

The solid specific gravity was measured with a solid densitometer.

(Characteristics of 3D Object; Curing Shrinkage)

The shrinkage percentage was calculated from the density immediately after curing.

(Characteristics of 3D Object; Shore Hardness)

The Shore D hardness and Shore A hardness were measured.

(Characteristics of 3D Object; Flexural Strength)

The flexural strength was measured in accordance with JIS K7171.

(Characteristics of 3D Object; Flexural Modulus)

The flexural modulus was measured in accordance with JIS K7171.

(Characteristics of 3D Object; Tensile Strength)

The tensile strength was measured in accordance with JIS K7162.

(Characteristics of 3D Object; Tensile Elongation)

The tensile strength was measured in accordance with JIS K7162.

(Characteristics of 3D Object; Elongation at Maximum Point)

The tensile strength was measured in accordance with JIS K7162.

(Characteristics of 3D Object; Thermogravimetric Analysis)

Using a thermogravimetric analyzer (manufactured by TA Instruments, trade name: Q-50), a sample of 5 mm×5 mm×5 mm was subjected to thermogravimetric analysis at a temperature rising rate of 10° C./min.

(Characteristics of Degreased Body; Shrinkage Percentage (Volume))

The volume shrinkage percentage from the 3D object to the degreased body was measured. The shrinkage percentage (volume) (%) is a value obtained by the following formula.

((Volume of 3D object)−(volume of degreased body))/(volume of 3D object)×100

(Characteristics of Degreased Body; Shrinkage Percentage (X-Axis Length)

The X-axis length shrinkage percentage from the 3D object to the degreased body was measured. The shrinkage percentage (X-axis length) (%) is a value obtained by the following formula.

((X-axis length of 3D object)−(X-axis length of degreased body))/(X-axis length of 3D object)×100

(Characteristics of Sintered Body; Shrinkage Percentage (Volume))

The volume shrinkage percentage from the 3D object to the sintered body was measured. The shrinkage percentage (volume) (%) is a value obtained by the following formula.

((Volume of 3D object)−(volume of sintered body))/(volume of 3D object)×100

(Characteristics of Sintered Body; Shrinkage Percentage (X-Axis Length)

The X-axis length shrinkage percentage from the 3D object to the sintered body was measured. The shrinkage percentage (X-axis length) (%) is a value obtained by the following formula.

((X-axis length of 3D object)−(X-axis length of sintered body))/(X-axis length of 3D object)×100

(Characteristics of Sintered Body; Dimensional Accuracy)

The dimensional accuracy from the 3D object to the sintered body was measured.

(Characteristics of Sintered Body; Density)

The density was measured with a solid densitometer.

(Characteristics of Sintered Body; Flexural Strength)

The flexural strength was measured in accordance with JIS K7171.

Example 1

A 3D shaping inkjet ink E1 was prepared by mixing the following materials:

38.8 parts of high-purity alumina (manufactured by Sumitomo Chemical Co., Ltd., AKP-53, median particle size: 0.18 μm) having a small particle size as a ceramic component (pigment);

0.91 parts of an active polymer dispersant (manufactured by Lubrizol Corporation, trade name: SOLSPERSE 36000, pour point: 40° C., boiling point: about 200° C., flash point: about 200° C., density: 1.05 g/cm$^3$) as a dispersant;

8.3 parts of an aliphatic polyester-based urethane acrylate oligomer (manufactured by Sartomer, trade name: CN968, number of functional groups: 6, density: 1.2 g/cm$^3$) as an oligomer of a binder component;

12.4 parts of benzyl acrylate (BZA) and 32.8 parts of phenoxyethyl acrylate (PEA) as monomers of a binder component;

0.50 parts of phenylbis(2,4,6-trimethylbenzoyl)phosphine oxide (manufactured by Ciba Specialty Chemicals, trade name: Irg 819) and 4.66 parts of 2,4,6-trimethylbenzoyl-diphenyl-phosphine oxide (manufactured by BASF SE, trade name: Irgacure-TPO) as a phosphine oxide-based initiator of a photopolymerization initiator;

1.58 parts of 2,4-diethylthioxanthene-9-one (DETX) as a thioxanthone-based sensitizer of a sensitizer;

0.04 parts of 2,5-di-tert-butylhydroquinone (manufactured by Seiko Chemical Co., Ltd., trade name: NONFLEX Alba) as a polymerization inhibitor; and 0.046 parts of fully crosslinked silicone polyether acrylate (manufactured by Evonik Industries AG, trade name: TEGO RAD2100, short chain siloxane backbone/long chain organic modified highly crosslinked additive) as a radiation curable additive. The composition, ceramic material concentration (mass % and vol %), and dispersant concentration (%: percentage relative to the ceramic material) of the 3D shaping inkjet ink E1 are shown in Table 1 (see, Example 1).

The ink physical properties and ink performance of the 3D shaping inkjet ink E1 were measured. The results are shown in Tables 2 and 3 (see, Example 1).

The 3D shaping inkjet ink E1 was repeatedly ejected (layer thickness: about 32 µm) and cured to form layers by an inkjet printer, thus obtaining a 3D object E1 of a rectangular parallelepiped of 5 cm×5 cm×5 cm. The characteristics of the 3D object E1 were measured. The results are shown in Table 4 (see, Example 1).

Figure 8:
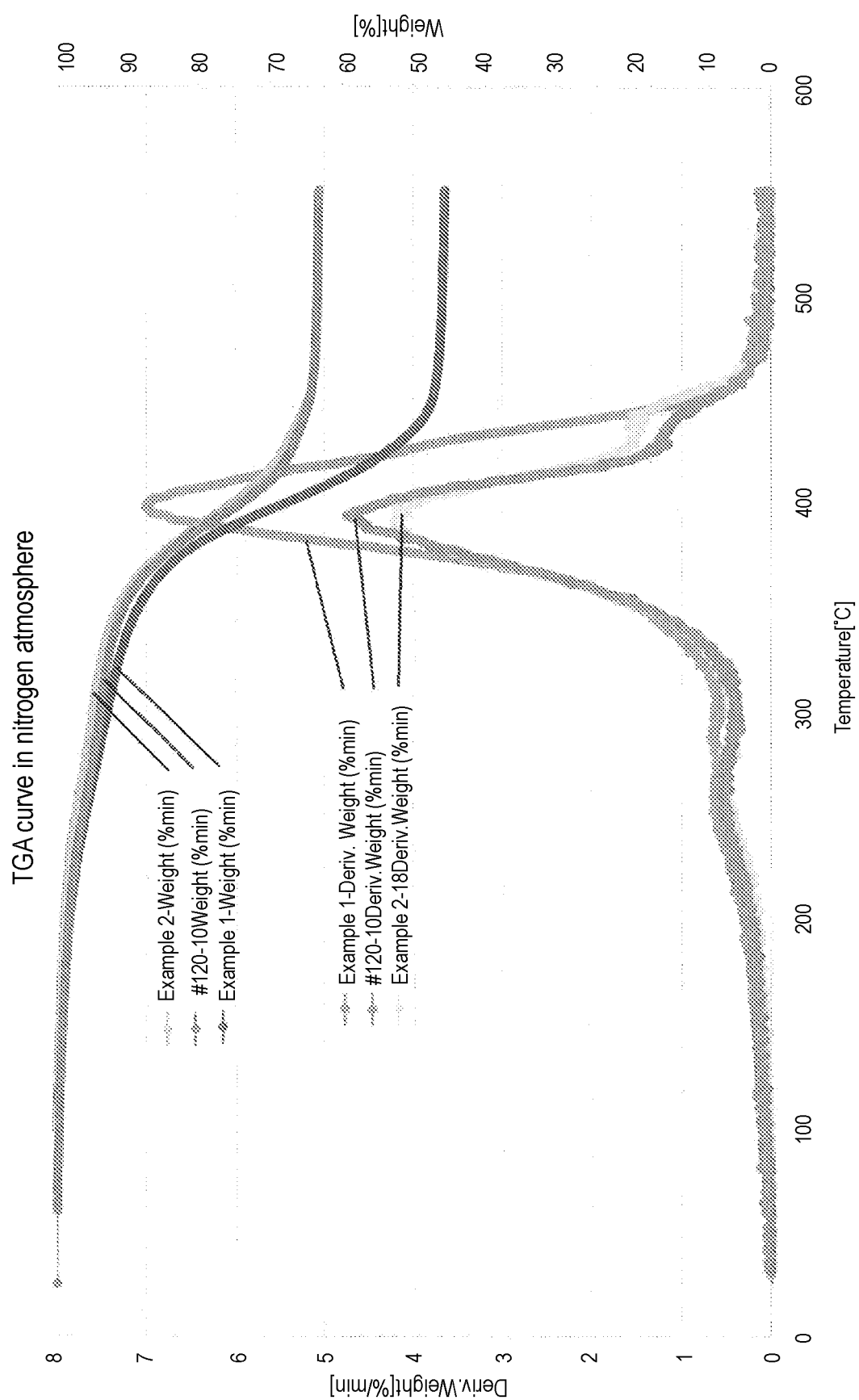
FIG. 8 is a TGA curve of a 3D object.

FIG. 8 shows a result of thermogravimetric analysis of the 3D object E1. As can be seen from the TGA curve (Example 1) in FIG. 8, when the temperature of the 3D object E1 is raised from room temperature, the low boiling point compound is vaporized from about 200° C., the binder component and the thermal decomposition product thereof are vaporized from about 340° C., the amount of decrease in weight is small at 500° C. or higher and 550° C. or lower, and the weight of the 3D object E1 decreases to about 45%.

The 3D object E1 was degreased under a nitrogen atmosphere at a maximum temperature of 340° C. for a total time of 170 hours by a temperature program of a first degreasing step (300° C., 15 min), a second degreasing step (310° C., 15 min), a third degreasing step (320° C., 15 min), a fourth degreasing step (330° C., 15 min), a fifth degreasing step (340° C., 15 min), and a temperature rising rate between the steps of 40° C./h to obtain a degreased body E1. The characteristics of the shrinkage percentage of the degreased body E1 were measured. The shrinkage percentage (volume) was 65.3%, and the shrinkage percentage (X-axis length) was 25.3%.

Next, the degreased body E1 was fired at 1,625° C. for 58 hours under an air atmosphere to obtain a sintered body E1. The characteristics of the sintered body E1 were measured. The results are shown in Table 5 (see, Example 1).

Figure 4:
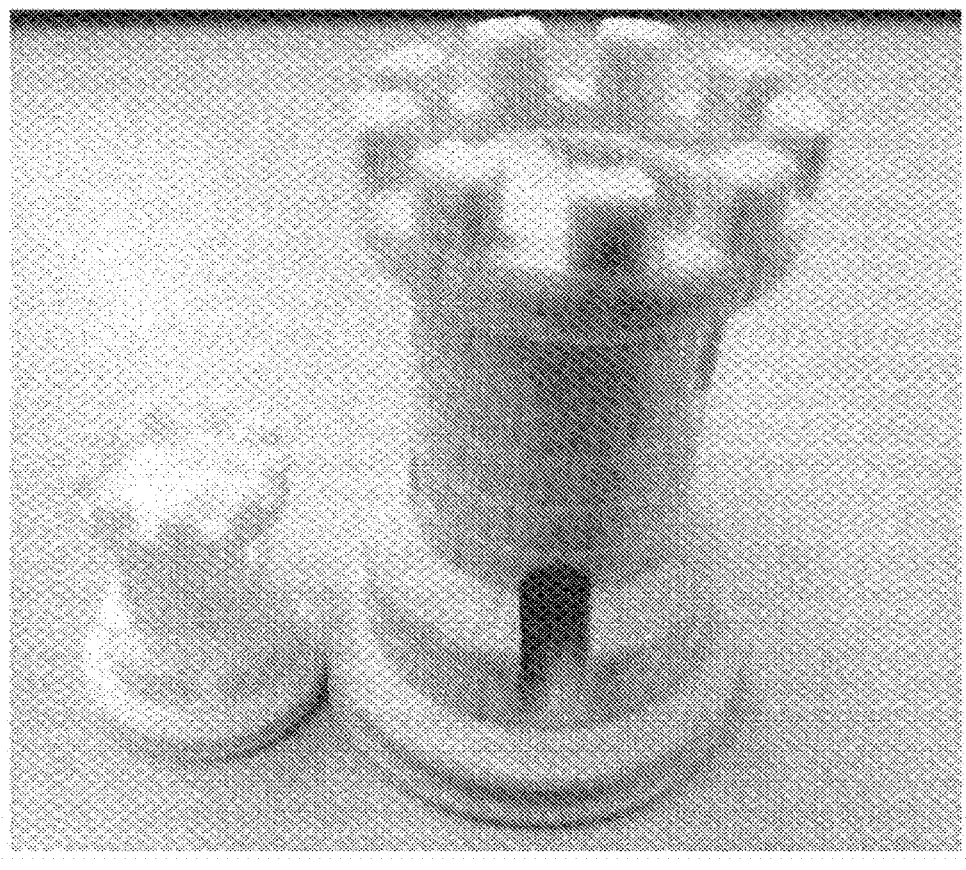
FIG. 4 is a photograph of a 3D object (right) obtained by inkjet printing using a 3D shaping inkjet ink according to an embodiment of the present invention and a sintered body (left) obtained by degreasing and sintering the 3D object.

A 3D object having a chess-piece shape, the object being printed using the 3D shaping inkjet ink E1 is shown on the right side in FIG. 4. A sintered body obtained by degreasing and sintering the 3D object is shown on the left side in FIG. 4. FIG. 4 shows that the 3D object shrinks without cracking, and the shape of 3D object is maintained in the sintered body. When the 3D object having a chess-piece shape was degreased, the weight thereof was reduced to 31.7%, and the shrinkage percentages in the XYZ axes thereof were respectively 73.3%, 63.3%, and 65.0%.

Reference Example 1

A 3D shaping inkjet ink R1 was prepared by mixing the following materials:

62.6 parts of high-purity alumina (manufactured by Sumitomo Chemical Co., Ltd., trade name: AKP-20, median particle size: 0.46 µm) having a large particle size as a ceramic component (pigment);

0.8 parts of an active polymer dispersant (manufactured by Lubrizol Corporation, trade name: SOLSPERSE 39000, flash point: higher than 186° C., melting point: higher than 3° C., pour point: higher than 3° C., decomposition temperature: higher than 250° C., density: 0.99 g/cm$^3$) as a dispersant;

2.0 parts of a urethane acrylate oligomer (manufactured by Miwon Specialty Chemical Co., Ltd., trade name: PU4300, number of functional groups: 4, number average molecular weight: 850) as an oligomer of a binder component;

9.8 parts of benzyl acrylate (BZA) and 17.36 parts of 2-(2-ethoxyethoxy)ethyl acrylate (EOEOEA) as monomers of a binder component;

0.6 parts of phenylbis(2,4,6-trimethylbenzoyl)phosphine oxide (manufactured by Ciba Specialty Chemicals Co., Ltd., trade name: Irg 819) and 5.6 parts of 2,4,6-trimethylbenzoyl-diphenyl-phosphine oxide (manufactured by BASF SE, trade name: Irgacure-TPO) as a phosphine oxide-based initiator of a photopolymerization initiator;

1.9 parts of 2,4-diethylthioxanthene-9-one (manufactured by Lambson, trade name: DETX) as a thioxanthone-based sensitizer of a sensitizer; and 0.05 parts of 2,5-di-tert-butylhydroquinone (trade name: NONFLEX Alba, manufactured by Seiko Chemical Co., Ltd.) as a polymerization inhibitor. The composition, ceramic material concentration (mass % and vol %), and dispersant concentration (%: percentage relative to the ceramic material) of the 3D shaping inkjet ink R1 are shown in Table 1 (see, Reference Example 1).

The ink physical properties and ink performance of the 3D shaping inkjet ink R1 were measured. The results are shown in Tables 2 and 3 (see, Reference Example 1).

The 3D shaping inkjet ink R1 was repeatedly ejected (layer thickness: about 32 µm) and cured to form layers by an inkjet printer, thus obtaining a 3D object R1 of a rectangular parallelepiped of 5 mm×5 mm×5 mm.

The 3D object R1 was heated at 5° C./h (maximum temperature: 650° C.) under a nitrogen or air atmosphere to degrease the 3D object R1, thus obtaining a degreased body R1.

The degreased body R1 was heated at 50° C./h (maximum temperature: 1,625° C.) under an air atmosphere and fired to obtain a sintered body R1. The characteristics of the sintered body R1 were measured in the same manner as in Example 1. The results are shown in Table 5 (see, Reference Example 1).

Example 2

A 3D shaping inkjet ink E2 was prepared by mixing the following materials:

60.7 parts of high-purity alumina (manufactured by Sumitomo Chemical Co., Ltd., trade name: AKP-20, median particle size: 0.46 µm) having a large particle size as a ceramic component (pigment);

1.2 parts of an active polymer dispersant (manufactured by Lubrizol Corporation, trade name: SOLSPERSE 36000, pour point: 40° C., boiling point: about 200° C., flash point: about 200° C., density: 1.05 g/cm$^3$) as a dispersant;

5.5 parts of an aliphatic polyester-based urethane acrylate oligomer (manufactured by Sartomer, trade name: CN968, number of functional groups: 6, density: 1.2 g/cm$^3$) as an oligomer of a binder component;

26.3 parts of benzyl acrylate (BZA) as a monomer of a binder component;

6.24 parts of 2,4,6-trimethylbenzoyl-diphenyl-phosphine oxide (manufactured by BASF SE, trade name: Irgacure-TPO) as a phosphine oxide-based initiator of a photopolymerization initiator;

0.02 parts of 2,5-di-tert-butylhydroquinone (manufactured by Seiko Chemical Co., Ltd., trade name: NONFLEX Alba) as a polymerization inhibitor; and 0.050 parts of fully crosslinked silicone polyether acrylate (manufactured by Evonik Industries AG, trade name: TEGO RAD2100, short chain siloxane backbone/long chain organic modified highly crosslinked additive) as a radiation curable additive. The composition, ceramic material concentration (mass % and vol %), and dispersant concentration (%: percentage relative to the ceramic material) of the 3D shaping inkjet ink E2 are shown in Table 1 (see, Example 2).

The ink physical properties and ink performance of the 3D shaping inkjet ink E2 were measured in the same manner as in Example 1. The results are shown in Tables 2 and 3 (see, Example 2).

In the same manner as in Example 1, the 3D shaping inkjet ink E2 was repeatedly ejected and cured to form layers by an inkjet printer, thus obtaining a 3D object E2. The characteristics of the 3D object E2 were measured. The results are shown in Table 4 (see, Example 2).

FIG. 8 shows a result of thermogravimetric analysis of the 3D object E2. As can be seen from the TGA curve (Example 2) in FIG. 8, when the temperature of the 3D object E2 is raised from room temperature, the low boiling point compound is vaporized from about 200° C., the binder component and the thermal decomposition product thereof are vaporized from about 340° C., the amount of decrease in weight is small at 500° C. or higher and 550° C. or lower, and the weight of the 3D object E2 decreases to about 63%.

Example 3

A 3D shaping inkjet ink E3 was prepared by mixing the following materials:

49.2 parts of high-purity alumina (manufactured by Sumitomo Chemical Co., Ltd., trade name: AKP-53, median particle size: 0.18 μm) having a small particle size as a ceramic component (pigment);

1.2 parts of an active polymer dispersant (manufactured by Lubrizol Corporation, trade name: SOLSPERSE 36000, pour point: 40° C., boiling point: about 200° C., flash point: about 200° C., density: 1.05 g/cm$^3$) as a dispersant;

7.8 parts of an aliphatic polyester-based urethane acrylate oligomer (manufactured by Sartomer, trade name: CN968, number of functional groups: 6, density: 1.2 g/cm$^3$) as an oligomer of a binder component;

15.3 parts of benzyl acrylate (BZA) and 20.4 parts of 2-(2-ethoxyethoxy)ethyl acrylate (EOEOEA) as monomers of a binder component;

6.24 parts of 2,4,6-trimethylbenzoyl-diphenyl-phosphine oxide (manufactured by BASF SE, trade name: Irgacure-TPO) as a phosphine oxide-based initiator of a photopolymerization initiator;

0.09 parts of 2,5-di-tert-butylhydroquinone (manufactured by Seiko Chemical Co., Ltd., trade name: NONFLEX Alba) as a polymerization inhibitor; and 0.050 parts of fully crosslinked silicone polyether acrylate (manufactured by Evonik Industries AG, trade name: TEGO RAD2100, short chain siloxane backbone/long chain organic modified highly crosslinked additive) as a radiation curable additive. The composition, ceramic material concentration (mass % and vol %), and dispersant concentration (%: percentage relative to the ceramic material) of the 3D shaping inkjet ink E3 are shown in Table 1 (see, Example 3).

The ink physical properties and ink performance of the 3D shaping inkjet ink E3 were measured in the same manner as in Example 1. The results are shown in Tables 2 and 3 (see, Example 3).

In the same manner as in Example 1, the 3D shaping inkjet ink E3 was repeatedly ejected and cured to form layers by an inkjet printer, thus obtaining a 3D object E3. The characteristics of the 3D object E3 were measured. The results are shown in Table 4 (see, Example 3).

Example 4

A 3D shaping inkjet ink inkjet ink E4 was prepared by mixing the following materials:

60.7 parts of high-purity alumina (manufactured by Sumitomo Chemical Co., Ltd., trade name: AKP-20, median particle size: 0.46 μm) having a large particle size as a ceramic component (pigment);

3.8 parts of an active polymer dispersant (manufactured by Lubrizol Corporation, trade name: SOLSPERSE 36000, pour point: 40° C., boiling point: about 200° C., flash point: about 200° C., density: 1.05 g/cm$^3$) as a dispersant;

3.8 parts of an aliphatic urethane acrylate oligomer (manufactured by Tomoe Engineering Co., Ltd., trade name: CN968, number of functional groups: 6, density: 1.2 g/cm$^3$) as an oligomer of a curable binder component;

28.0 parts of benzyl acrylate (BZA) as a monomer of a curable binder component;

6.24 parts of 2,4,6-trimethylbenzoyl-diphenyl-phosphine oxide (manufactured by BASF SE, trade name: Irgacure-TPO) as a phosphine oxide-based initiator of a photopolymerization initiator;

0.02 parts of 2,5-di-tert-butylhydroquinone (trade name: NONFLEX Alba, manufactured by Seiko Chemical Co., Ltd.) as a polymerization inhibitor; and 0.050 parts of fully crosslinked silicone polyether acrylate (manufactured by Evonik Industries AG, trade name: TEGO RAD2100, short chain siloxane backbone/long chain organic modified highly crosslinked additive) of a silicone-based surface regulator as a radiation curable additive. The composition, ceramic concentration (mass % and vol %), and dispersant concentration (%: percentage relative to the ceramic material) of the 3D shaping inkjet ink E4 are shown in Table 1 (see, Example 4).

The ink physical properties and ink performance of the 3D shaping inkjet ink E4 were measured in the same manner as in Example 1. The results are shown in Tables 2 and 3 (see, Example 4).

In the same manner as in Example 1, the 3D shaping inkjet ink E4 was repeatedly ejected and cured to form layers by an inkjet printer, thus obtaining a 3D object E4. The characteristics of the 3D object E4 were measured. The results are shown in Table 4 (see, Example 4).

The 3D object E4 was degreased in the same manner as in Example 1 to obtain a degreased body E4. The characteristics of the shrinkage percentage of the degreased body E4 were measured. The shrinkage percentage (volume) was 32.8%, and the shrinkage percentage (X-axis length) was 10.3%.

The degreased body E4 was fired at 1,625° C. for 35 hours under an air atmosphere to obtain a sintered body E4. The shrinkage percentage (volume) was 63.5%, the shrinkage percentage (X-axis length) was 25.7%, and the dimensional accuracy was 3%. As characteristics of the sintered body E4, the bulk density, apparent density, open porosity, and flexural strength were measured in the same manner as in Example 1. The results are shown in Table 5 (see, Example 4).

TABLE 1

| Mill base | | Example 1 | Example 3 | Example 4 | Example 2 | Reference Example 1 |
|---|---|---|---|---|---|---|
| Ceramic material | AKP-53 (small particle size) | 38.8 | 49.2 | | | |
| | AKP-20 (large particle size) | | | 60.7 | 60.7 | 62.6 |
| Dispersant | S39000 | | | | | 0.8 |
| | S36000 | 0.9 | 1.2 | 1.2 | 1.2 | |
| Oligomer | PU4300 (tetrafunctional) | | | | | 2.0 |
| | CN968 (hexafunctional) | 8.3 | 7.8 | 3.8 | 5.5 | |
| Monomer | BZA (monofunctional) | 12.4 | 15.3 | 28.0 | 26.3 | 9.8 |
| | PEA (monofunctional) | 32.8 | | | | |
| | EOEOEA (monofunctional) | | 20.40 | | | 17.36 |
| Initiator | Irg819 | 0.50 | | | | 0.60 |
| | IrgTPO | 4.66 | 6.24 | 6.24 | 6.24 | 5.60 |
| Sensitizer | DETX | 1.58 | | | | 1.90 |
| Polymerization inhibitor | Alba | 0.04 | 0.09 | 0.02 | 0.02 | 0.05 |
| Surface regulator | TEGORAD2100 | 0.046 | 0.050 | 0.050 | 0.050 | |
| Total | | 100.0 | 100.1 | 100.0 | 100.0 | 100.8 |
| Ceramic material concentration (wt %) | | 38.8 | 49.6 | 60.7 | 60.7 | 62.6 |
| Ceramic material concentration (vol %) | | 14.9 | 21.4 | 30.0 | 30.0 | 31.7 |
| Dispersant concentration (based on ceramic material (%)) | | 2.36 | 2.34 | 2.00 | 2.00 | 1.28 |

Abbreviations in Table 1 are as follows.
AKP-20: Alumina (manufactured by Sumitomo Chemical Co., Ltd., median particle size: 0.46 μm)
AKP-53: Alumina (manufactured by Sumitomo Chemical Co., Ltd., median particle size: 0.18 μm)
S39000: SOLSPERSE 39000 (manufactured by Lubrizol Corporation, flash point: higher than 186° C., melting point: higher than 3° C., pour point: higher than 3° C., decomposition temperature: higher than 250° C., density: 0.99 g/cm$^3$)
S36000: SOLSPERSE 36000 (manufactured by Lubrizol Corporation, pour point: 40° C., boiling point: about 200° C., flash point: about 200° C., density: 1.05 g/cm$^3$)
PU4300: Urethane acrylate oligomer (manufactured by Miwon Specialty Chemical Co., Ltd, number of functional groups: 4, number average molecular weight: 850)
CN968: Aliphatic polyester-based urethane acrylate oligomer (manufactured by Sartomer, number of functional groups: 6, density: 1.2 g/cm$^3$)
BZA: Benzyl acrylate
PEA: Phenoxyethyl acrylate
EOEOEA: 2-(2-Ethoxyethoxy)ethyl acrylate
Irg 819: Phenylbis(2,4,6-trimethylbenzoyl)phosphine oxide (manufactured by Ciba Specialty Chemicals)
Irg TPO: Irgacure-TPO, 2,4,6-trimethylbenzoyl-diphenyl-phosphine oxide (manufactured by BASF SE)
DETX: 2,4-Diethylthioxanthene-9-one
Alba: NONFLEX Alba, 2,5-di-tert-butylhydroquinone (manufactured by Seiko Chemical Co., Ltd.)
TEGORAD 2100: Fully crosslinked silicone polyether acrylate (manufactured by Evonik Industries AG)

TABLE 2

| Ink physical properties | | | Example 1 | Example 3 | Example 4 | Example 2 | Reference Example 1 |
|---|---|---|---|---|---|---|---|
| Ink physical properties | Density [g/ccm] | 25° C. | 1.508 | 1.649 | 1.916 | 1.935 | 1.916 |
| | Specific gravity SG | 25° C. | 1.512 | 1.654 | 1.921 | 1.941 | — |
| | Surface tension [mN/m] | 25° C. | 30 | 29.5 | 31.0 | 30.7 | 35.4 |
| | Viscosity [mPa · s] | 25° C. | 50.1 | 43.6 | 35.7 | 48.4 | 35.4 |
| | | 35° C. | 36.3 | 31.4 | 24.9 | 34.9 | — |
| | | 45° C. | 25.3 | 23.7 | 19.7 | 27 | 19.9 |
| | | 55° C. | — | 19.2 | 16.3 | 22.5 | 17.6 |
| | Particle size distribution (Microtrac) | D10% | 0.175 | 0.191 | 0.508 | 0.363 | 0.384 |
| | | D50% | 1.280 | 0.305 | 0.818 | 0.531 | 0.632 |
| | | D90% | 0.455 | 0.491 | 1.255 | 1.036 | 0.943 |
| | | D95% | 0.530 | 0.579 | 1.409 | 1.327 | 1.054 |
| | Particle size distribution (LA-960) | D10% | 0.072 | 0.067 | 0.081 | 0.087 | 0.061 |
| | | D50% | 0.115 | 0.106 | 0.218 | 0.356 | 0.092 |
| | | D90% | 0.172 | 0.190 | 0.600 | 0.523 | 0.524 |
| | | D95% | 0.229 | 0.319 | 0.762 | 0.629 | 0.701 |

TABLE 2-continued

| Ink physical properties | | Example 1 | Example 3 | Example 4 | Example 2 | Reference Example 1 |
|---|---|---|---|---|---|---|
| | % R | 95.1 | 94.9 | 93.2 | 94.1 | 92.0 |
| | % B | 80.3 | 80.2 | 80.4 | 79.8 | 80.0 |

TABLE 3

| | | Example 1 | Example 3 | Example 4 | Example 2 | Reference Example 1 |
|---|---|---|---|---|---|---|
| Ink performance | Storability | 30 days (corresponding to 12 months) | 30 days (corresponding to 12 months) | 30 days (corresponding to 12 months) | 30 days (corresponding to 12 months) | 15 days (corresponding to 6 months) |
| | Ink absorbance (385 nm) [Abs] | 1.61 | 1.84 | 3.08 | 2.97 | >7 |
| | Film absorbance (385 nm) [Abs] | 0.82 | 0.74 | 1.05 | 1.05 | 2.48 |
| | Precipitation percentage [wt %] (based on pigment) | 11.21 | 32.0 | 87.0 | 86.4 | 104.4 |
| | Redispersion percentage [wt %] (based on precipitate) | 51.5 | 62.0 | 5.5 | 7.3 | 2.67 |
| | Formation of interface with support agent | 4 | 4 | 4 | 5 | 2 |
| | Abrasion resistance | 3 | 3 | 2 | 2 | 2 |
| | Warpage [°] | 21.6 | 8.1 | 2.5 | — | 1.5 |
| | Curability (pencil hardness) | 3H | 2H | H | — | 3B |

TABLE 4

| | | | Example 1 | Example 3 | Example 4 | Example 2 | Reference Example 1 |
|---|---|---|---|---|---|---|---|
| Warpage | Actual machine test: | During printing | No | No | No | No | — |
| | Actual machine test: | After printing | No | No | No | No | — |
| Solid specific gravity | | | 1.608 | 1.821 | 2.069 | 2.076 | — |
| Curing and shrinkage | Shrinkage percentage [%] | | 5.98 | 9.19 | 6.51 | 6.49 | — |
| Shore hardness | D | n = 3, 60 sec | 13.3 | 13.2 | 13.2 | 12.5 | — |
| | A | n = 3, 60 sec | 79.3 | 80.0 | 79.5 | 79.2 | — |
| Flexural strength | MPa | n = 10 | 2.77 | 1.08 | 2.13 | 2.74 | — |
| Flexural modulus | MPa | n = 10 | 30.53 | 38.75 | 22.27 | 30.68 | — |

TABLE 4-continued

|  |  |  | Example 1 | Example 3 | Example 4 | Example 2 | Reference Example 1 |
|---|---|---|---|---|---|---|---|
| Tensile strength | MPa | n = 4 | 3.02 | 1.00 | 2.13 | — | — |
| Tensile elongation | % | n = 4 | 18.93 | 3.29 | 19.30 | — | — |
| Elongation at maximum point | mm | n = 4 | 14.3 | 3.9 | 16.5 | — | — |

TABLE 5

|  |  | Example 1 | Example 3 | Example 4 | Example 2 | Reference Example 1 |
|---|---|---|---|---|---|---|
| Shrinkage percentage (volume) | % | 81.4 | — | 63.5 | — | — |
| Shrinkage percentage (X-axis length) | % | 41.6 | — | 25.7 | — | — |
| Dimensional accuracy | % | 4% | — | 3% | — |  |
| Density | g/cm³ (JIS) | 3.65 | — | 3.91 | — | 3.82 |
|  | (relative %) | 91.6 | — | 97.9% | — | 95.4 |
| Flexural strength (number of n) | MPa | 44.4 (6) | — | 326 (4) | — | 137 (1) |

The present invention enables various embodiments and modifications without departing from the broad spirit and scope of the present invention. In addition, the above-described embodiments are for describing the present invention, and do not limit the scope of the present invention. That is, the scope of the present invention is indicated not by the embodiments but by the claims. Various modifications made within the scope of the claims and the meaning of the invention equivalent thereto are regarded as being within the scope of the present invention.

The invention claimed is:

1. A method for manufacturing a sintered product from a three-dimensional object, the method comprising:
   a step of forming a multilayer made of an ink containing inorganic particles and an organic material to prepare a three-dimensional object;
   a first degreasing step of heating the three-dimensional object at a first average degreasing temperature for a first heating time under an inert gas atmosphere to degrease the organic material;
   a second degreasing step of heating the three-dimensional object degreased in the first degreasing step, under an inert gas atmosphere at a second average degreasing temperature higher than the first average degreasing temperature for a second heating time to degrease the organic material to obtain the three-dimensional object having a degreasing percentage in a range of 80% or more and 90% or less; and
   a sintering step of sintering the three-dimensional object degreased in the second degreasing step, at an average sintering temperature higher than the second average degreasing temperature to obtain a sintered product.

2. The method for manufacturing the sintered product from the three-dimensional object as set forth in claim 1, the method further comprising
   between the first degreasing step and the second degreasing step, one or more additional degreasing steps of heating and degreasing the three-dimensional object under an inert atmosphere at an average degreasing temperature higher than the first average degreasing temperature and lower than the second average degreasing temperature,
   wherein, when the method includes two or more of the additional degreasing steps, the average degreasing temperature of each of the additional degreasing steps is increased stepwise.

3. The method for manufacturing the sintered product from the three-dimensional object as set forth in claim 1, wherein
   the second average degreasing temperature is a temperature at which, when an object containing the organic material is heated at the second average degreasing temperature under an inert gas atmosphere for 30 minutes, 80 mass % or more of the organic material in the object before heating is degreased.

4. The method for manufacturing the sintered product from the three-dimensional object as set forth in claim 3, the method further comprising
   between the first degreasing step and the second degreasing step, one or more additional degreasing steps of heating and degreasing the three-dimensional object under an inert atmosphere at an average degreasing temperature higher than the first average degreasing temperature and lower than the second average degreasing temperature,
   wherein, when the method includes two or more of the additional degreasing steps, the average degreasing temperature of each of the additional degreasing steps is increased stepwise.

5. The method for manufacturing the sintered product from the three-dimensional object as set forth in claim 1, wherein
   in the first degreasing step and the second degreasing step, a temperature rising rate at the time of heating to the first average degreasing temperature and the second average degreasing temperature is less than 10° C./min.

6. The method for manufacturing the sintered product from the three-dimensional object as set forth in claim 5, wherein the second average degreasing temperature is a temperature at which, when an object containing the organic material is heated at the second average degreasing temperature under an inert gas atmosphere for 30 minutes, 80 mass % or more of the organic material in the object before heating is degreased.

7. The method for manufacturing the sintered product from the three-dimensional object as set forth in claim 5, the method further comprising between the first degreasing step and the second degreasing step, one or more additional degreasing steps of heating and degreasing the three-dimensional object under an inert atmosphere at an average degreasing temperature higher than the first average degreasing temperature and lower than the second average degreasing temperature, wherein, when the method includes two or more of the additional degreasing steps, the average degreasing temperature of each of the additional degreasing steps is increased stepwise.

\* \* \* \* \*